US012676140B2

(12) United States Patent
Kim et al.

(10) Patent No.: US 12,676,140 B2
(45) Date of Patent: *Jul. 7, 2026

(54) SPEECH TRANSLATION METHOD AND SYSTEM USING MULTILINGUAL TEXT-TO-SPEECH SYNTHESIS MODEL

(71) Applicant: NEOSAPIENCE, INC., Seoul (KR)

(72) Inventors: Taesu Kim, Suwon-si (KR); Younggun Lee, Seoul (KR)

(73) Assignee: NEOSAPIENCE, INC., Seoul (KR)

( * ) Notice: Subject to any disclaimer, the term of this patent is extended or adjusted under 35 U.S.C. 154(b) by 188 days.

This patent is subject to a terminal disclaimer.

(21) Appl. No.: 18/770,736

(22) Filed: Jul. 12, 2024

(65) Prior Publication Data

US 2024/0363098 A1     Oct. 31, 2024

Related U.S. Application Data

(63) Continuation of application No. 18/371,704, filed on Sep. 22, 2023, now Pat. No. 12,080,273, which is a (Continued)

(30) Foreign Application Priority Data

Jan. 11, 2018    (KR) ........................ 10-2018-0004047
Mar. 29, 2018    (KR) ........................ 10-2018-0036377
Jan. 11, 2019    (KR) ........................ 10-2019-0004188

(51) Int. Cl.
*G10L 13/10*          (2013.01)
*G06F 40/40*          (2020.01)
(Continued)

(52) U.S. Cl.
CPC .............. *G10L 13/10* (2013.01); *G06F 40/40* (2020.01); *G06N 3/04* (2013.01); *G06N 3/044* (2023.01);
(Continued)

(58) Field of Classification Search
CPC ........ G06F 40/40; G06N 3/045; G06N 3/044; G06N 3/04; G06N 3/08; G10L 13/10;
(Continued)

(56) References Cited

U.S. PATENT DOCUMENTS 9,342,509 B2    5/2016  Meng et al.
9,552,807 B2    1/2017  Rossano et al.
(Continued)

FOREIGN PATENT DOCUMENTS

JP        2017032839 A    2/2017
KR      100255106 B1    5/2000
(Continued)

OTHER PUBLICATIONS

Javier Latorre, et al., "New Approach to the Polyglot Speech Generation by Means of an HMM-Based Speaker Adaptable Synthesizer," Speech Communication. vol. 48, Issue 10, pp. 1227-1243, section 4, Oct. 2006, URL: www.sciencedirect.com/science/article/pii/S0167639306000483.

(Continued)

*Primary Examiner* — Nicole A K Schmieder
(74) *Attorney, Agent, or Firm* — Dinsmore & Shohl LLP; Yongsok Choi, Esq.

(57)             ABSTRACT

A speech translation method using a multilingual text-to-speech synthesis model includes receiving input speech data of the first language and an articulatory feature of a speaker regarding the first language, converting the input speech data of the first language into a text of the first language, converting the text of the first language into a text of the second language, and generating output speech data for the text of the second language that simulates the speaker's speech by inputting the text of the second language and the articulatory feature of the speaker to a single artificial neural network text-to-speech synthesis model.

11 Claims, 14 Drawing Sheets

Related U.S. Application Data continuation of application No. 16/925,888, filed on Jul. 10, 2020, now Pat. No. 11,810,548, which is a continuation of application No. PCT/KR2019/000513, filed on Jan. 11, 2019.

(51) Int. Cl.

| | |
|---|---|
| *G06N 3/04* | (2023.01) |
| *G06N 3/044* | (2023.01) |
| *G06N 3/045* | (2023.01) |
| *G06N 3/08* | (2023.01) |
| *G10L 13/033* | (2013.01) |
| *G10L 13/047* | (2013.01) |
| *G10L 13/08* | (2013.01) |
| *G10L 25/30* | (2013.01) |

(52) U.S. Cl.
CPC .............. *G06N 3/045* (2023.01); *G06N 3/08* (2013.01); *G10L 13/033* (2013.01); *G10L 13/047* (2013.01); *G10L 13/086* (2013.01); *G10L 25/30* (2013.01)

(58) Field of Classification Search
CPC ... G10L 13/033; G10L 13/047; G10L 13/086; G10L 25/30
See application file for complete search history.

(56) References Cited

U.S. PATENT DOCUMENTS

| | | | |
|---|---|---|---|
| 9,922,641 B1 | 3/2018 | Chun | |
| 10,867,136 B2 | 12/2020 | Lee et al. | |
| 11,810,548 B2 * | 11/2023 | Kim ..................... | G06N 3/0464 |
| 12,080,273 B2 * | 9/2024 | Kim ........................ | G10L 13/10 |
| 2009/0037179 A1 | 2/2009 | Liu et al. | |
| 2011/0238407 A1 | 9/2011 | Kent | |
| 2015/0186359 A1 | 7/2015 | Fructoso et al. | |
| 2016/0005403 A1 | 1/2016 | Agiomyrgiannakis et al. | |
| 2016/0140951 A1 | 5/2016 | Agiomyrgiannakis et al. | |
| 2017/0255616 A1 | 9/2017 | Yun et al. | |
| 2019/0087734 A1 | 3/2019 | Ide et al. | |
| 2019/0362703 A1 | 11/2019 | Ijima et al. | |
| 2020/0058289 A1 | 2/2020 | Gabryjelski et al. | |
| 2022/0172703 A1 | 6/2022 | Matsunaga et al. | |

FOREIGN PATENT DOCUMENTS

| | | | |
|---|---|---|---|
| KR | 1020100068965 A | 6/2010 | |
| KR | 1020140120560 A | 10/2014 | |
| KR | 1020160138837 A | 12/2016 | |
| KR | 1020170103209 A | 9/2017 | |
| WO | 2017168870 A1 | 10/2017 | |

OTHER PUBLICATIONS

Jong-Jin Kim, et al., "Development Trend of Interactive Q&A System Based on Voice Language Technology," Magazine, The Institute of Electronics and Information Engineers (IEIE), Mar. 2014, pp. 79-91, vol. 41, issue 3.

International Search Report of PCT/KR2019/000513 dated Apr. 2, 2019.

Yu Zhang, et al., "Learning to Speak Fluently in a Foreign Language: Multilingual Speech Synthesis and Cross-Language Voice Cloning", Journal Article ArXiv abs/1907.04448, Jul. 9, 2019, 5 pgs.

Sercan Ö Arik, et al., "Deep Voice 2: Multi-Speaker Neural Text-to-Speech", Computation and Language, Sep. 20, 2017, Baidu Silicon Valley Artificial Intelligence Lab, 1195 Bordeaux Dr. Sunnyvale, CA 94089.

Younggun Lee, et al., "Emotional End-to-End Neural Speech Synthesizer", Sound (cs.SD), Computation and Language (cs.CL), Audio and Speech Processing (eess.AS), Nov. 15, 2017, Cornell University Library, 201 Olin Library Cornell University Ithaca, NY 14853.

Huaiping Ming et al., "A Light-weight Method of Building an LSTM-RNN-based Bilingual TTS System", International Conference on Asian Language Processing (IALP), IEEE, Dec. 5, 2017, pp. 201-204.

Yoon Kim, et al., "Character-Aware Neural Language Models", Proc. of the 13th AAAI conf. on AI, 2741-2749, 2016.

* cited by examiner

100

LEARNING CASE 1: LEARNING WITH KOREAN DATA

LEARNING CASE 2: LEARNING WITH ENGLISH DATA

TEST CASE 1: KOREAN SPEAKER UTTERS IN ENGLISH

TEST CASE 2: ENGLISH SPEAKER UTTERS IN KOREAN

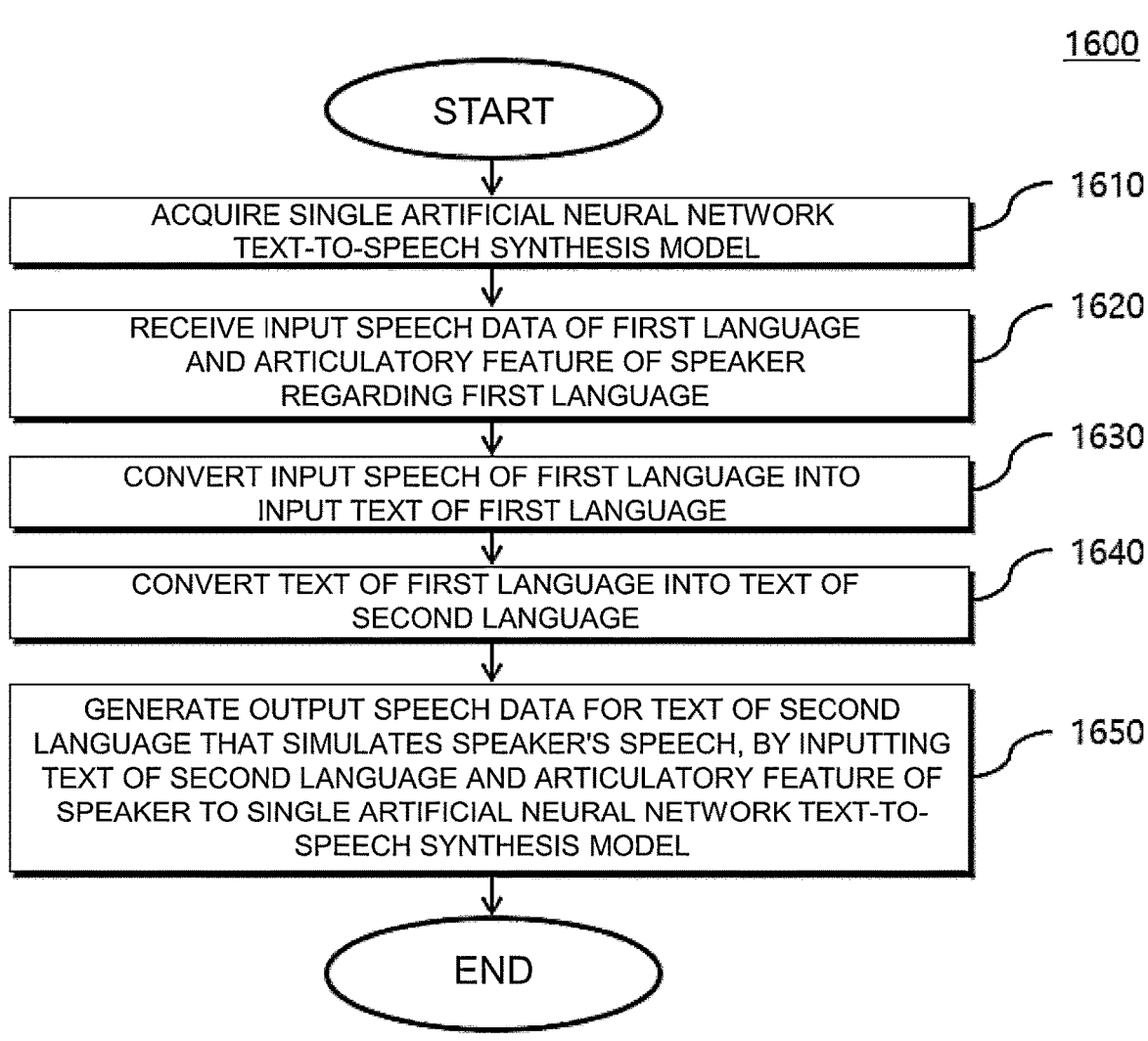

1600

START

ACQUIRE SINGLE ARTIFICIAL NEURAL NETWORK TEXT-TO-SPEECH SYNTHESIS MODEL          1610

RECEIVE INPUT SPEECH DATA OF FIRST LANGUAGE AND ARTICULATORY FEATURE OF SPEAKER REGARDING FIRST LANGUAGE          1620

CONVERT INPUT SPEECH OF FIRST LANGUAGE INTO INPUT TEXT OF FIRST LANGUAGE          1630

CONVERT TEXT OF FIRST LANGUAGE INTO TEXT OF SECOND LANGUAGE          1640

GENERATE OUTPUT SPEECH DATA FOR TEXT OF SECOND LANGUAGE THAT SIMULATES SPEAKER'S SPEECH, BY INPUTTING TEXT OF SECOND LANGUAGE AND ARTICULATORY FEATURE OF SPEAKER TO SINGLE ARTIFICIAL NEURAL NETWORK TEXT-TO-SPEECH SYNTHESIS MODEL          1650

END

FIG. 17

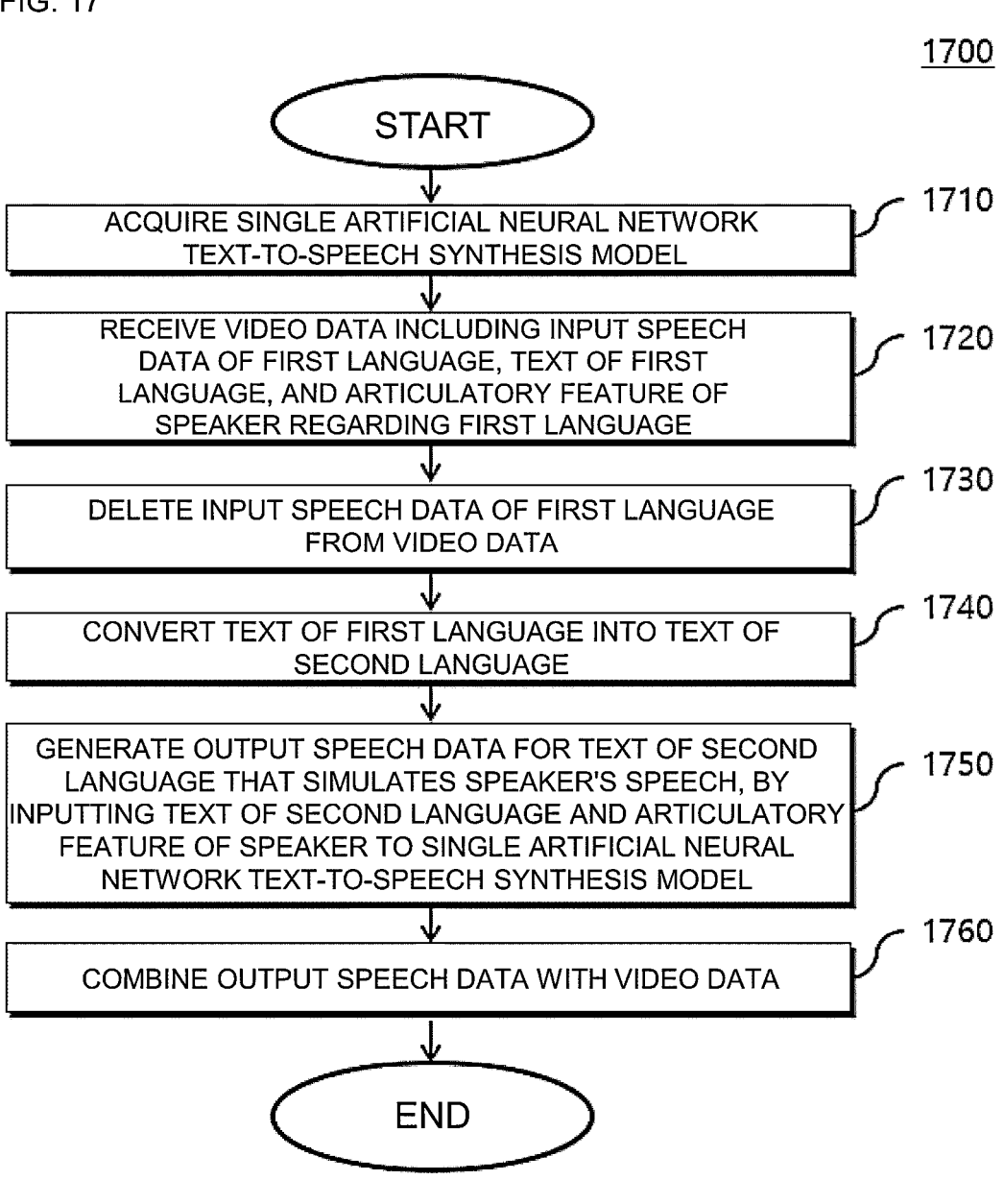

1700

START

ACQUIRE SINGLE ARTIFICIAL NEURAL NETWORK
TEXT-TO-SPEECH SYNTHESIS MODEL — 1710

RECEIVE VIDEO DATA INCLUDING INPUT SPEECH
DATA OF FIRST LANGUAGE, TEXT OF FIRST
LANGUAGE, AND ARTICULATORY FEATURE OF
SPEAKER REGARDING FIRST LANGUAGE — 1720

DELETE INPUT SPEECH DATA OF FIRST LANGUAGE
FROM VIDEO DATA — 1730

CONVERT TEXT OF FIRST LANGUAGE INTO TEXT OF
SECOND LANGUAGE — 1740

GENERATE OUTPUT SPEECH DATA FOR TEXT OF SECOND
LANGUAGE THAT SIMULATES SPEAKER'S SPEECH, BY
INPUTTING TEXT OF SECOND LANGUAGE AND ARTICULATORY
FEATURE OF SPEAKER TO SINGLE ARTIFICIAL NEURAL
NETWORK TEXT-TO-SPEECH SYNTHESIS MODEL — 1750

COMBINE OUTPUT SPEECH DATA WITH VIDEO DATA — 1760

END

SPEECH TRANSLATION METHOD AND SYSTEM USING MULTILINGUAL TEXT-TO-SPEECH SYNTHESIS MODEL

CROSS-REFERENCE TO RELATED APPLICATIONS

This application is a continuation of U.S. patent application Ser. No. 18/371,704 filed on Sep. 22, 2023, which is a continuation of U.S. patent application Ser. No. 16/925,888 filed on Jul. 10, 2020 issued as U.S. Pat. No. 11,810,548, which is a continuation of International Application No. PCT/KR2019/000513 filed on Jan. 11, 2019, which claims priority to Korean Patent Application No. 10-2018-0004047 field on Jan. 11, 2018, Korean Patent Application No. 10-2018-0036377 filed on Mar. 29, 2018, and Korean Patent Application No. 10-2019-0004188 filed on Jan. 11, 2019, the entire contents of which are herein incorporated by reference.

TECHNICAL FIELD

The present disclosure relates to a speech translation method or system using a multilingual text-to-speech synthesis model.

The present disclosure also relates to a video translation method and system using a multilingual text-to-speech synthesis model.

BACKGROUND ART

Generally, speech synthesis technology which is also called text-to-speech (TTS) is a technology used to reproduce a necessary speech without pre-recording an actual human speech in an application requiring a human speech such as an announcement, navigation, artificial intelligence (AI) assistance, and the like. As a typical speech synthesis method, there are Concatenative TTS in which a speech is divided and stored in advance in very short units such as phonemes and phonemes constituting a sentence to be synthesized are combined to synthesize a speech, and Parametric TTS in which speech features are expressed by parameters and a speech corresponding to a sentence to be synthesized is synthesized from parameters expressing speech features constituting the sentence by means of a vocoder.

Recently, an artificial neural network-based speech synthesis method has been actively studied, and a speech synthesized according to this speech synthesis method shows much more natural speech features than those of conventional methods. However, in order to implement a speech synthesizer of a new voice using an artificial neural network-based speech synthesis method, a lot of data corresponding to the voice is required, and re-learning of the neural network model using the data is required.

In addition, research is also underway to translate a text of a specific language into a text of another language and synthesize it into a speech of the translated language. Here, for the speech synthesis of the translated language, speech data of a speaker, which has representative feature of the language, may be used.

SUMMARY

Technical Problem

The present disclosure provides a speech translation method or system using a multilingual text-to-speech synthesis model.

The present disclosure also provides a video translation method and system using a multilingual text-to-speech synthesis model.

Technical Solution

A speech translation method using a multilingual text-to-speech synthesis model according to an embodiment of the present disclosure includes: acquiring a single artificial neural network text-to-speech synthesis model trained based on a learning text of a first language and learning speech data of the first language corresponding to the learning text of the first language, and a learning text of a second language and learning speech data of the second language corresponding to the learning text of the second language; receiving input speech data of the first language and an articulatory feature of a speaker regarding the first language; converting the input speech data of the first language into a text of the first language; converting the text of the first language into a text of the second language; and generating output speech data for the text of the second language that simulates the speaker's speech by inputting the text of the second language and the articulatory feature of the speaker to the single artificial neural network text-to-speech synthesis model.

In a speech translation method using a multilingual text-to-speech synthesis model according to an embodiment of the present disclosure, the articulatory feature of the speaker regarding the first language may be generated by extracting a feature vector from speech data uttered by the speaker in the first language.

The speech translation method using a multilingual text-to-speech synthesis model according to an embodiment of the present disclosure may further include generating an emotion feature of the speaker regarding the first language from the input speech data of the first language, in which the generating the output speech data for the text of the second language that simulates the speaker's speech may include generating output speech data for the text of the second language that simulates the speaker's speech by inputting the text of the second language, the articulatory feature, and the emotion feature of the speaker regarding the first language to the single artificial neural network text-to-speech synthesis model.

In the speech translation method using a multilingual text-to-speech synthesis model according to an embodiment of the present disclosure, the emotion feature may include information on emotions inherent in a content uttered by the speaker.

The speech translation method using a multilingual text-to-speech synthesis model according to an embodiment of the present disclosure may further include generating a prosody feature of the speaker regarding the first language from the input speech data of the first language, in which the generating the output speech data for the text of the second language that simulates the speaker's speech may include generating output speech data for the text of the second language that simulates the speaker's speech by inputting the text of the second language, the articulatory feature, and the prosody feature of the speaker regarding the first language to the single artificial neural network text-to-speech synthesis model.

In the speech translation method using a multilingual text-to-speech synthesis model according to an embodiment of the present disclosure, the prosody feature may include at least one of information on utterance speed, information on accentuation, information on voice pitch, and information on pause duration.

A video translation method using a multilingual text-to-speech synthesis model according to an embodiment of the present disclosure may include: acquiring a single artificial neural network text-to-speech synthesis model trained based on a learning text of a first language and learning speech data of the first language corresponding to the learning text of the first language, and a learning text of a second language and learning speech data of the second language corresponding to the learning text of the second language; receiving video data including input speech data of the first language, a text of the first language corresponding to the input speech data of the first language, and an articulatory feature of a speaker regarding the first language; deleting the input speech data of the first language from the video data; converting the text of the first language into a text of the second language; generating output speech data for the text of the second language that simulates the speaker's speech by inputting the text of the second language and the articulatory feature of the speaker regarding the first language to the single artificial neural network text-to-speech synthesis model; and combining the output speech data with the video data.

The video translation method using a multilingual text-to-speech synthesis model according to an embodiment of the present disclosure may further include generating an emotion feature of the speaker regarding the first language from the input speech data of the first language, in which the generating the output speech data for the text of the second language that simulates the speaker's speech may include generating output speech data for the text of the second language that simulates the speaker's speech by inputting the text of the second language, the articulatory feature, and the emotion feature of the speaker regarding the first language to the single artificial neural network text-to-speech synthesis model.

The video translation method using a multilingual text-to-speech synthesis model according to an embodiment of the present disclosure may further include generating a prosody feature of the speaker regarding the first language from the input speech data of the first language, in which the generating the output speech data for the text of the second language that simulates the speaker's speech may include generating output speech data for the text of the second language that simulates the speaker's speech by inputting the text of the second language, the articulatory feature, and the prosody feature of the speaker regarding the first language to the single artificial neural network text-to-speech synthesis model.

In addition, a program for implementing the speech translation and video translation methods using a multilingual text-to-speech synthesis model described above may be recorded on a computer-readable recording medium.

DESCRIPTION OF DRAWINGS

FIG. 16 is a flowchart showing a speech translation method according to an embodiment.

FIG. 17 is a flowchart showing a video translation method according to an embodiment.

DETAILED DESCRIPTION

Figure 1:
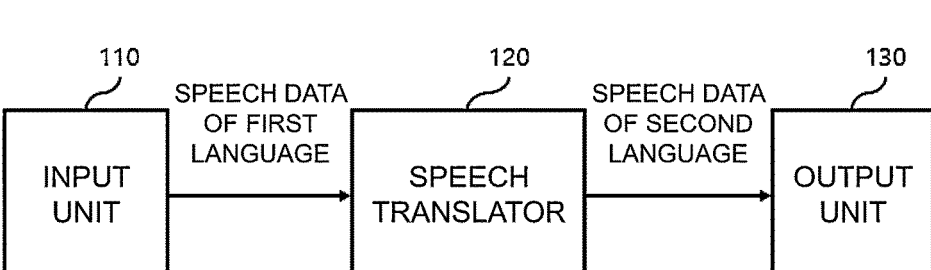
FIG. 1 is a block diagram showing a speech translation system according to an embodiment.

Advantages and features of the disclosed embodiments and methods of accomplishing the same will be apparent by referring to embodiments described below in connection with the accompanying drawings. The present disclosure may, however, be embodied in different forms and should not be construed as limited to the embodiments set forth herein. Rather, these embodiments are provided so that this disclosure will be thorough and complete and will fully convey the scope of the present invention to those skilled in the art.

Terms used herein will be briefly described, and disclosed embodiments will be described in detail below.

The terms used herein have been selected as general terms which are widely used at present in consideration of the functions of the present disclosure, and this may be altered according to the intent of an operator skilled in the art, conventional practice, or introduction of new technology. Also, in a specific case, a term is arbitrarily selected by the applicant, and a meaning of the term will be described in detail in a corresponding description portion of the exemplary embodiments. Therefore, the terms used herein should be defined based on the overall content of the present disclosure instead of a simple name of each of the terms.

As used herein, the singular forms "a," "an," and "the" are intended to include the plural forms as well unless the context clearly indicates the singular forms. Also, the plural forms are intended to include the singular forms as well, unless the context clearly indicates the plural forms.

Further, throughout the description, when a portion is stated as "comprising (including)" an element, unless specified to the contrary, it intends to mean that the part may additionally comprise (or include or have) another element, rather than excluding the same.

Furthermore, the term "unit" used herein denotes a software or hardware component, and the "unit" performs certain roles. However, the meaning of the "unit" is not limited to software or hardware. The "unit" may be configured to be in an addressable storage medium or to execute one or more processors. Accordingly, as an example, the "unit" includes elements such as software elements, object-oriented software elements, class elements, and task elements, processes, functions, attributes, procedures, subroutines, program code segments, drivers, firmware, microcodes, circuits, data, database, data structures, tables, arrays, and variables. Furthermore, functions provided in the elements and the "units" may be combined as a smaller number of elements and "units" or further divided into additional elements and "units."

According to an embodiment of the present disclosure, the "unit" may be implemented as a processor or a memory. The term "processor" should be interpreted broadly to encompass a general-purpose processor, a central processing unit (CPU), a microprocessor, a digital signal processor (DSP), an application processor (AP), a controller, a microcontroller, a state machine, and the like. Under some circumstances, a "processor" may refer to an application-specific integrated circuit (ASIC), a programmable logic device (PLD), a field-programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

Hereinafter, exemplary embodiments will be fully described with reference to the accompanying drawings in such a way that those skilled in the art can easily carry out the embodiments. Further, in order to clearly illustrate the present invention, parts not related to the description are omitted in the drawings.

FIG. 1 is a block diagram showing a speech translation system according to an embodiment of the present disclosure.

As shown, a speech translation system 100 may include an input unit 110, a speech translator 120, and an output unit 130. The input unit 110 may receive a speech and transmit speech data of a first language to the speech translator 120.

The input unit 110 may include various means that may receive the speech. For example, the input unit 110 may include one of various voice input devices or means, such as a microphone, a voice recorder, a headset, and the like, which can receive voice directly from a user. In another example, the input unit 110 may be an input device that may receive speech data stored in a memory or database. In still another example, the input unit 110 may be a wireless or wired input device that may receive speech data through a wireless or wired network such as Bluetooth, WiFi, and the Internet. In still another example, the input unit 110 may be a processor or a voice processing device that may extract speech data from video data or video files stored in a memory, video data or video files that may be downloaded online.

The speech translator 120 may convert the speech data of the first language into a speech data of a second language. According to the present disclosure, the term "first language" may refer to any one of various languages used in various countries or by various people, such as Korean, Japanese, Chinese, English language and the like, and the term "second language" may refer to one of languages used in countries or by people other than those of the first language. The speech translator 120 may use an artificial neural network or a machine learning model to translate a speech of the first language into a speech of the second language, as described in detail below. The artificial neural network or machine learning model used in the speech translator 120 may include any one of various artificial neural network models including a recurrent neural network (RNN), a long short-term memory model (LSTM), a deep neural network (DNN), a convolution neural network (CNN), and the like, or a combination thereof.

In an embodiment, the speech translator 120, when translating a speech of the first language into a speech of the second language, may generate speech data of the second language by reflecting at least one of an articulatory feature, a prosody feature, or an emotion feature of a speaker who uses the first language. In another embodiment, the speech translator 120, when translating a speech of the first language into a speech of the second language, may generate speech data of the second language by reflecting at least one of a articulatory feature, a prosody feature, or an emotion feature of another speaker who is different than the speaker of the speech of the first language.

The output unit 130 may output the speech data of the second language generated by the speech translator 120. The output unit 130 may include a means that may output the speech. For example, the output unit 130 may include one of various voice output devices or means, such as speakers, headsets, headphones, earphones, and the like, that may convert the speech data of the second language into sound. In another example, the output unit 130 may be an output device that may transmit and store speech data to the memory or database. In still another example, the output unit 130 may be a wireless or wired output device that may transmit speech data through a wireless or wired network such as Bluetooth, WiFi, the Internet, and the like. In still another example, the output unit 130 may be a processor or a voice processing device that may combine the speech data with the video data or image files, to convert it into a form that may be transmitted and stored in the memory or downloaded online.

Figure 2:
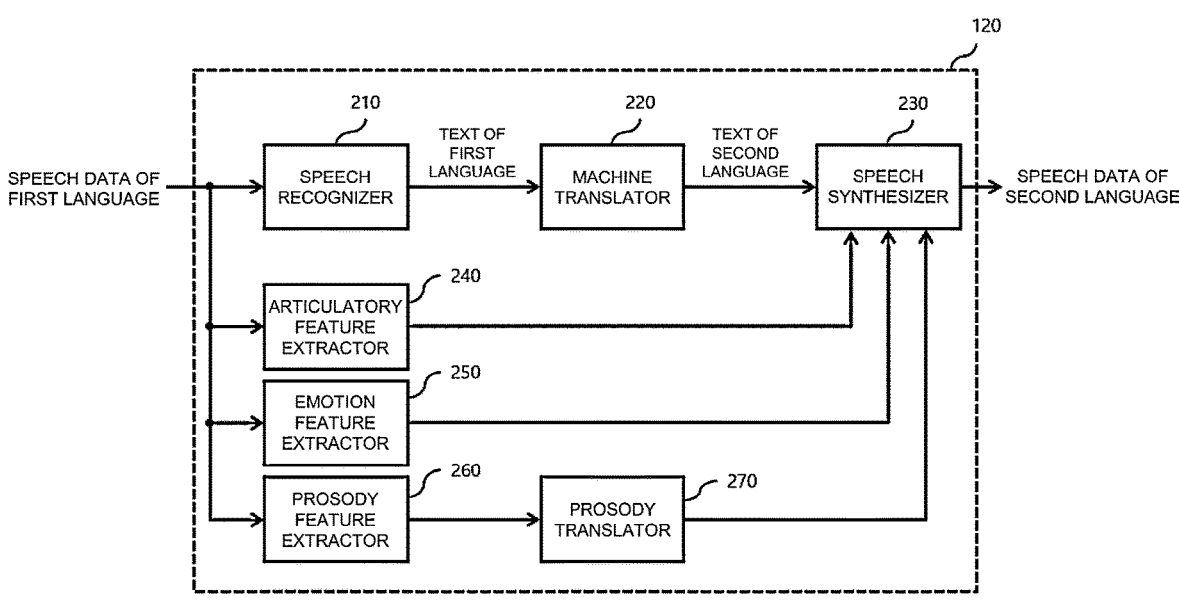
FIG. 2 is a block diagram showing a detailed configuration of a speech translator according to an embodiment.

FIG. 2 is a block diagram showing a detailed configuration of the speech translator according to an embodiment of the present disclosure.

The speech translator 120 includes a speech recognizer 210, a machine translator 220, a speech synthesizer 230, an articulatory feature extractor 240, an emotion feature extractor 250, and a prosody feature extractor 260 or a prosody translator 270.

The speech recognizer 210 may convert the speech data of the first language into a text of the first language. The speech recognizer 210 may use one of various speech recognition algorithms known in the art of the present disclosure to convert the speech data of the first language into a text of the first language. For example, the speech recognition algorithm used by the speech recognizer 210 may include any one of the statistical pattern recognition method such as hidden Markov model (HMM), Gaussian mixture model (GMM), and support vector machine (SVM), or the artificial neural network model such as RNN, LSTM, DNN, and CNN, or a combination thereof, but not limited thereto.

The machine translator 220 may receive the text of the first language from the speech recognizer 210 and generate a text of the second language. That is, the machine translator 220 converts the text of the first language into a text of the second language having the same or similar meaning. For example, the machine translator 220 may use one of various machine translation algorithms, such as statistical machine translation, artificial neural network machine translation, and the like in order to convert the text of the first language into the text of the second language, but not limited thereto. When using the machine translation algorithm, the machine translator 220 may generate a machine translation model by executing machine learning based on a plurality of texts of first language and a plurality of corresponding texts of second language. The machine translator 220 may generate a text of the second language by inputting a text of the first language into a pre-trained machine translation model as described above.

The speech synthesizer 230 may receive a text of the second language from the machine translator 220 and output corresponding speech data of the second language.

In an embodiment, in addition to the text of the second language, the speech synthesizer 230 may receive the articulatory feature of the speaker regarding the first language, and generate output speech data for the text of the second language that simulates the speaker's speech. Here, the articulatory feature of the speaker regarding the first language may include at least one of a voice tone of articulation of the speaker or a voice pitch of articulation of the speaker.

In another embodiment, in addition to the text of the second language, the speech synthesizer 230 may receive the articulatory feature of the speaker regarding the first language and the emotion feature of the speaker regarding the first language, and generate output speech data for the text of the second language that simulates the speaker's speech. Here, the emotion feature of the speaker regarding the first language may include information on emotions (e.g., emotions such as joy, sadness, anger, fear, trust, disgust, surprise or expectation of the speaker) inherent in content uttered by the speaker.

In still another embodiment, in addition to the text of the second language, the speech synthesizer 230 may receive the articulatory feature of the speaker regarding the first language and the prosody feature of the speaker regarding the first language, and generate output speech data for the text of the second language that simulates the speaker's speech. In this example, the prosody feature of the speaker regarding the first language may include at least one of information on utterance speed, information on accentuation, information on voice pitch, and information on pause duration.

In the speech synthesizer 230, the articulatory feature, the emotion feature, and the prosody feature of the speaker regarding the first language received in addition to a text of the second language may be extracted from speech data uttered by any speaker regarding the first language. In an embodiment, the articulatory feature, the emotion feature, and the prosody feature of the speaker regarding the first language may be extracted from speech data uttered by different speakers to each other who use the first language. For example, the emotion feature and the prosody feature regarding the first language are extracted from the speech data of the first language, and the articulatory feature regarding the first language may be extracted from voice data uttered by a third speaker (e.g., celebrities whose voice is known, such as entertainers, politician, and the like) other than the speaker of the voice data of the first language. As described above, the articulatory feature, the emotion feature, and the prosody feature of the speaker regarding the first language, which are extracted from the speech data uttered by the speaker regarding the first language, may be received from the outside of the speech translator 120, or may be extracted from the speech data of the first language input to the speech translator 120.

In addition, the articulatory feature, the emotion feature, or the prosody feature of the speaker regarding the first language may be generated by extracting a feature vector from the speech data uttered by the speaker in the first language. For example, the feature vector extracted from the speech data uttered in the first language may include one of various voice feature vectors such as mel-frequency cepstral coefficient (MFCC), linear predictive coefficients (LPC), perceptual linear prediction (PLP), and the like, but is not limited thereto.

The speech translator 120 may include at least one of the articulatory feature extractor 240, the emotion feature extractor 250 or the prosody feature extractor 260 in order to extract the articulatory feature, the emotion feature, or the prosody feature of the speaker regarding the first language from the speech data of the first language. The articulatory feature extractor 240 may generate the articulatory feature of the speaker regarding the first language from the speech data of the first language. The emotion feature extractor 250 may generate the emotion feature of the speaker regarding the first language from the speech data of the first language. In addition, the prosody feature extractor 260 may generate the prosody feature of the speaker regarding the first language from the speech data of the first language. The speech synthesizer 230 may receive, in addition to the text of the second language received from the machine translator 220, the information from at least one of the articulatory feature extractor 240, the emotion feature extractor 250, and the prosody feature extractor 260 and generate output speech data for the text of the second language that simulates the speaker's speech regarding the first language.

The speech synthesizer 230 may use a single artificial neural network text-to-speech synthesis model to convert the text of the second language into a speech data of the second language. The single artificial neural network text-to-speech synthesis model is one of various text-to-speech synthesis models using the artificial neural network described in detail below, and may be a text-to-speech synthesis model trained based on a plurality of learning texts of first language and learning speech data of the first language corresponding to the plurality of the learning texts of first language, and a plurality of learning texts of second language and learning speech data of the second languages corresponding to the plurality of learning texts of the second language.

In this case, the speech synthesizer 230 may input at least one of the articulatory feature, the emotion feature or the prosody feature of the speaker regarding the first language into the multilingual text-to-speech synthesis model, and generate output speech data for the text of the second language that simulates the speaker's speech regarding the first language.

As described, when the speech translator 120 extracts the feature of the speaker from the speech data uttered by the speaker regarding the first language and uses it to translate and synthesize the speech data of the second language from the speech data of the first language, even when the text-to-speech synthesis model of the speech synthesizer 230 has not learned about the voice of the speaker in advance, the speech of the speaker may be simulated to generate output speech data of the second language. In addition, when the speech translator 120 reflects the emotion feature or the prosody feature of the speaker regarding the first language to translate and synthesize speech data of the second language from the speech data of the first language, the output speech data of the second language may be generated by simulating the emotion or the prosody inherent in the voice uttered by the speaker.

The speech translator 120 may further include the prosody translator 270 that receives the prosody feature regarding the first language output from the prosody feature extractor 260 and generate the prosody feature regarding the second language. As shown, the prosody translator 270 may receive the prosody feature extracted from the speech data of the first language by the prosody feature extractor 260. The prosody translator 270 may convert the prosody feature extracted from the speech data of the first language into a prosody feature of the output speech of the second language. As described, when the prosody translator 270 extracts the prosody feature of the speaker from the input speech of the first language and translates it into the prosody feature of the second language, features such as speech speed, pauses while reading, emphasis, etc. of the speech of the first language may be reflected in the output speech of the second language.

Figure 3:
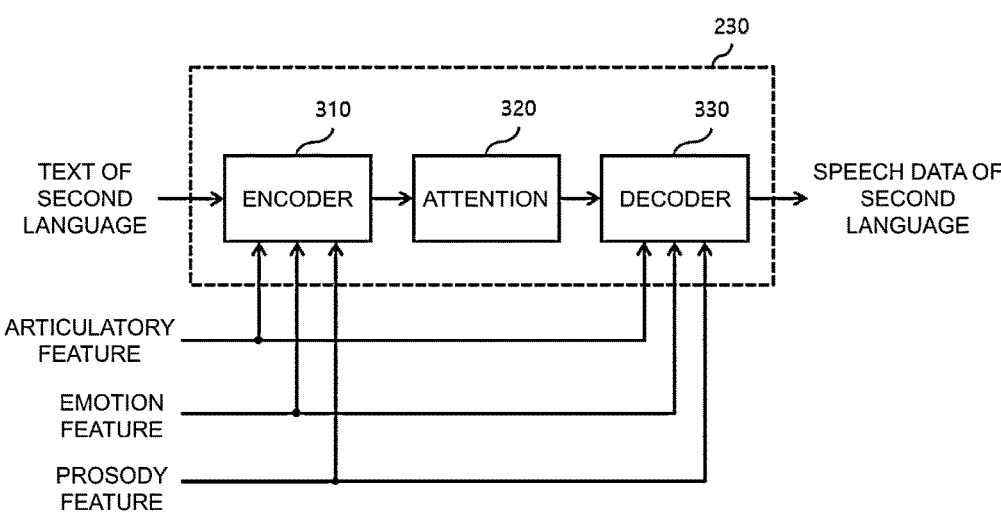
FIG. 3 is a block diagram showing a detailed configuration of a speech synthesizer according to an embodiment.

FIG. 3 is a block diagram showing a detailed configuration of a speech synthesizer according to an embodiment of the present disclosure. As shown, the speech synthesizer 230 may include an encoder 310, an attention 320, and a decoder 330. The encoder 310 included in the speech synthesizer 230 receives the text of the second language and generates information indicating which input text corresponds to a speech to be synthesized. In addition, the attention 320 generates position information of an input text from which a speech is to be synthesized. The decoder 330 generates speech data corresponding to the input text over time based on the position information of the input text received from the attention 320.

Further, the encoder 310 and the decoder 330 included in the speech synthesizer 230 may receive the articulatory feature, the emotion feature, and the prosody feature of the speaker. Herein, the articulatory feature, the emotion feature, and the prosody feature may be a speaker embedding vector, an emotion embedding vector, or a prosody embedding vector, respectively. As described in detail with reference to FIGS. 5 to 7 below, in converting the input text of the second language into corresponding speech data of the second language, the encoder 310, the attention 320, and the decoder 330 included in the speech synthesizer 230 may configure a single artificial neural network text-to-speech synthesis model that simulates a speech of a target speaker by reflecting the articulatory feature, the emotion feature, and/or the prosody feature of the target speaker. According to an embodiment of the present disclosure, the single artificial neural network text-to-speech synthesis model configured by the speech synthesizer 230 may be trained using a sequence-to-sequence model (seq2seq). For example, the sequence-to-sequence model may be implemented by combining an attention mechanism (see "Neural Machine Translation by Jointly Learning to Align and Translate," Dzmitry Bahdanau, at al., 2015 and "Effective Approaches to Attention-based Neural Machine Translation," Minh-Thang Luong, at al., 2015) with an encoder-decoder architecture based on RNN (see "Sequence to Sequence Learning with Neural Networks," Ilya Sutskever, et al., 2014).

Figure 4:
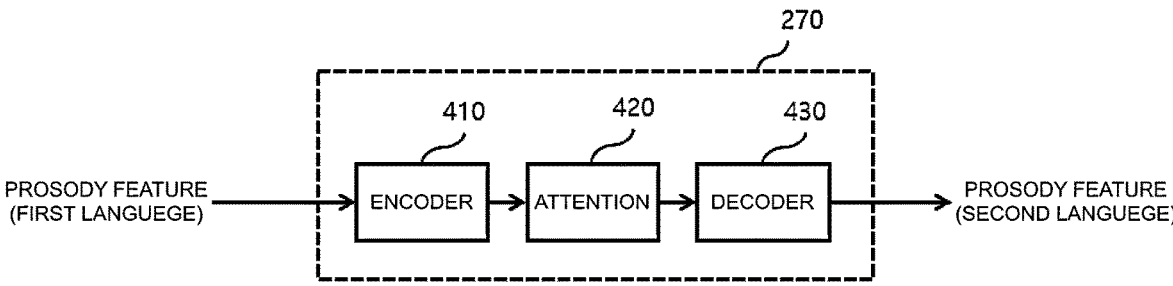
FIG. 4 is a block diagram showing a detailed configuration of a prosody translator according to an embodiment.

FIG. 4 is a block diagram showing a detailed configuration of a prosody translator according to an embodiment of the present disclosure.

As shown, the prosody translator 270 may include a prosody encoder 410, an attention 420, and a prosody decoder 430. The encoder 410 included in the prosody translator 270 receives the prosody feature of the first language, and generates information indicating which prosody feature is to be translated. In addition, the attention 420 generates position information of the prosody feature to be translated. The decoder 430 generates the prosody feature of the second language corresponding to the prosody feature over time based on the position information of the prosody feature received from the attention 420.

The encoder 410, the attention 420, and the decoder 430 included in the prosody translator 270 may be trained using the sequence-to-sequence model (seq2seq). For example, the sequence-to-sequence model may be implemented by combining the attention mechanism with an encoder-decoder architecture based on RNN.

Figure 5:
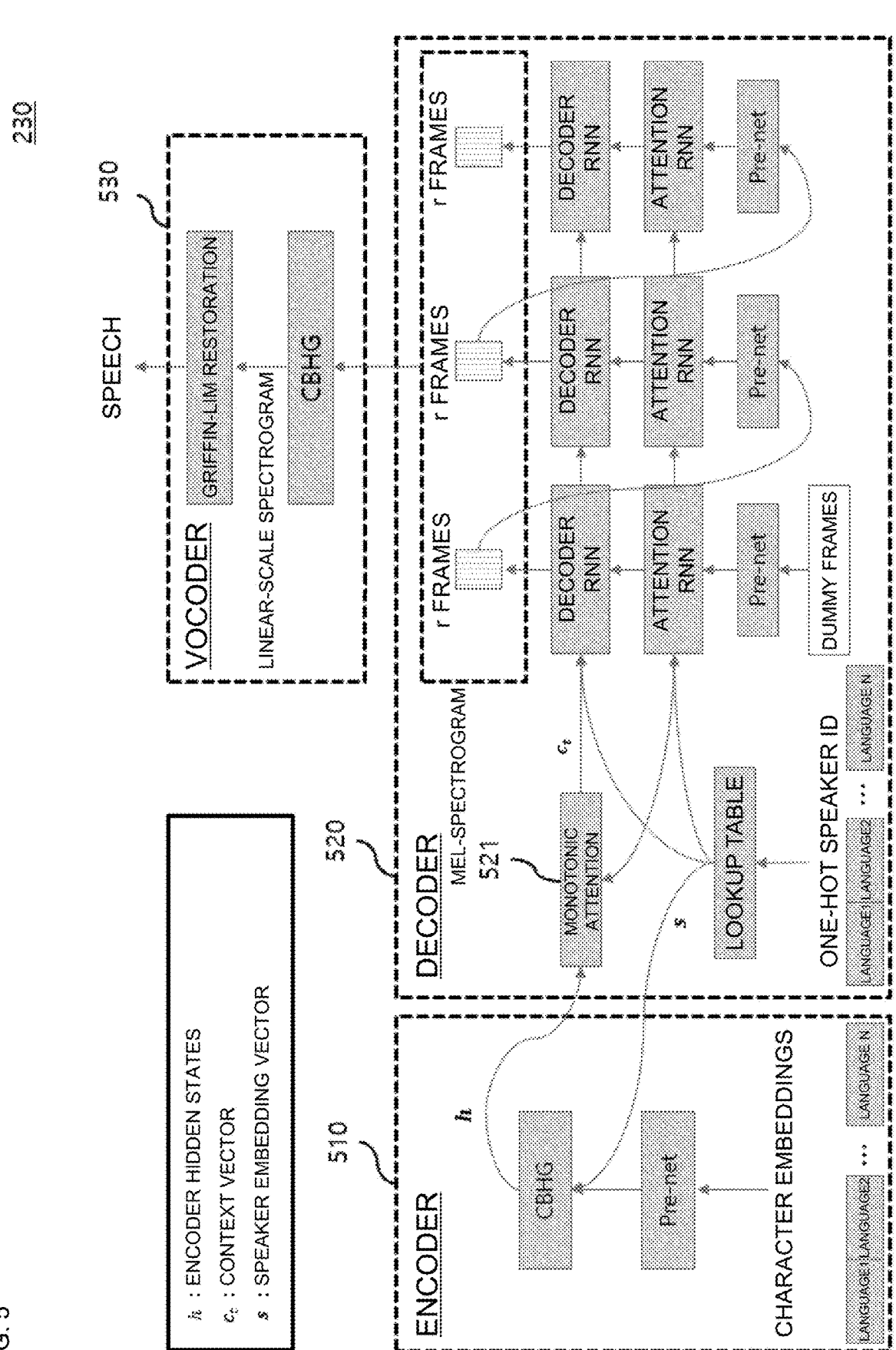
FIG. 5 is a diagram showing a configuration of an artificial neural network-based speech synthesizer for simulating voice in a specific language according to an embodiment.

FIG. 5 is a diagram showing a configuration of an artificial neural network-based speech synthesizer for simulating voice in a specific language according to an embodiment.

The artificial neural network-based speech synthesizer 230 may learn using a database configured with a pair of learning text of multi-languages (language 1, language 2, . . . , language N) and corresponding multilingual learning speech data. The speech synthesizer 230 may receive the text, apply the text to the machine learning model, compare the output speech data with the target speech data, and define a loss function. The target speech data may be the speech data recorded directly by a target speaker. The speech synthesizer 230 may learn the loss function through an error back-propagation algorithm and thus may obtain an artificial neural network that generates finally desired output speech data when any text is input. The speech synthesizer 230 may include an encoder 510, a decoder 520, and a vocoder 530. The encoder 510 and the decoder 520 of FIG. 5 may correspond to the encoder 310 and the decoder 330 of FIG. 3, respectively. In addition, a monotonic attention 521 included in the decoder 520 may correspond to the attention 320 of FIG. 3.

The encoder 510 included in the speech synthesizer 230 may receive at least one text embedding (e.g., language 1, language 2, . . . , language N). In this example, the text embedding may be an embedding vector corresponding to text divided by units of a syllable, a character, or a phoneme. The encoder 510 may use a pre-trained machine learning model to acquire a text embedding vector. The encoder may update the machine learning model while performing machine learning, and in this case, the text embedding vector for the divided text may also be changed.

The encoder 510 included in the speech synthesizer 230 may pass a text embedding vector through a pre-net module including a fully-connected layer. The pre-net may be a general feedforward layer or a linear layer.

The encoder 510 may pass the output of the pre-net module through the CBHG module. The CBHG module may include at least one of an 1D convolution bank, a max pooling, a highway network, and a bidirectional Gated Recurrent Unit (GRU). The encoder 510 may output hidden states h output from the CBHG module to the decoder 520. The hidden states output from the encoder 510 may be information indicating from which input text a speech is to be synthesized.

The attention 521 (monotonic attention) of the decoder 520 may receive the hidden states h received from the encoder 510. In addition, the attention 521 of the decoder 520 may receive information from the attention RNN. The information received from the attention RNN may be information regarding which speeches the decoder 520 has generated up to the previous time-step. In addition, the attention 521 of the decoder 520 may output a context vector $c_t$ based on the information received from the attention RNN and the hidden states received from the encoder 510. The context vector $c_t$ may be information for determining from which part of the input text the speech is to be generated at the current time-step. For example, the attention 521 of the decoder 520 may output information for generating a speech based on the front portion of the text input at the beginning of the speech generation and generating a speech based on the rear portion of the text input as the speech is being generated.

The decoder 520 may include at least one set of a pre-net module including a fully connected layer, an attention RNN including GRU, and a decoder RNN including residual GRU. The decoder RNN of the decoder 520 may generate r frames. The decoder 520 may arrange the generated r frames in chronological order and output speech data expressed in a mel-scale spectrogram.

In order to synthesize speech, the decoder 520 may receive a one-hot speaker ID that is information corresponding to the articulatory feature of the speaker. The decoder 520 may search for the one-hot speaker ID in a lookup table to acquire an embedding vector s of the speaker corresponding to the one-hot speaker ID. The embedding vector s of the speaker may be output to the CBHG module of the encoder 510, the decoder RNN, or the attention RNN of the decoder 520. The decoder RNN or the attention RNN may configure the structure of the artificial neural network such that decoding is performed differently depending on the speaker.

In addition, the speech synthesizer 230 may use a database including a text, a speaker index, and a speech signal to learn an artificial neural network. The input text may be configured as a one-hot vector in units of character. In order to receive a multilingual text, it may be configured as the one-hot vector that may express all the multilingual characters. Optionally, information indicating a specific language may be additionally input. By changing the language through the information indicating the specific language, a speech that pronounces a language different from the specific language may be synthesized in the specific language style. In addition, by inputting the speaker information additionally, different speeches may be synthesized for each speaker, or a speech may be synthesized as if the speaker speaks a different language. In this way, the text, the speaker information, the language information, and the like are respectively input to the artificial neural network, and the corresponding speech signal is used as a target to learn using the method described above, so that when the text and the speaker information are provided as an input, a speech synthesizer that may output the speech of the speaker is obtained.

The vocoder 530 may receive the output of the decoder 520. The CBHG module included in the vocoder 530 may convert the output of the decoder 520 into a linear-scale spectrogram. The output of the CBHG module included in the vocoder 530 may be a magnitude spectrogram. The vocoder 530 may predict the phase of the spectrogram through the Griffin-Lim algorithm. The vocoder 530 may output a speech signal in a time domain using the Inverse Short-Time Fourier Transform.

Figure 6:
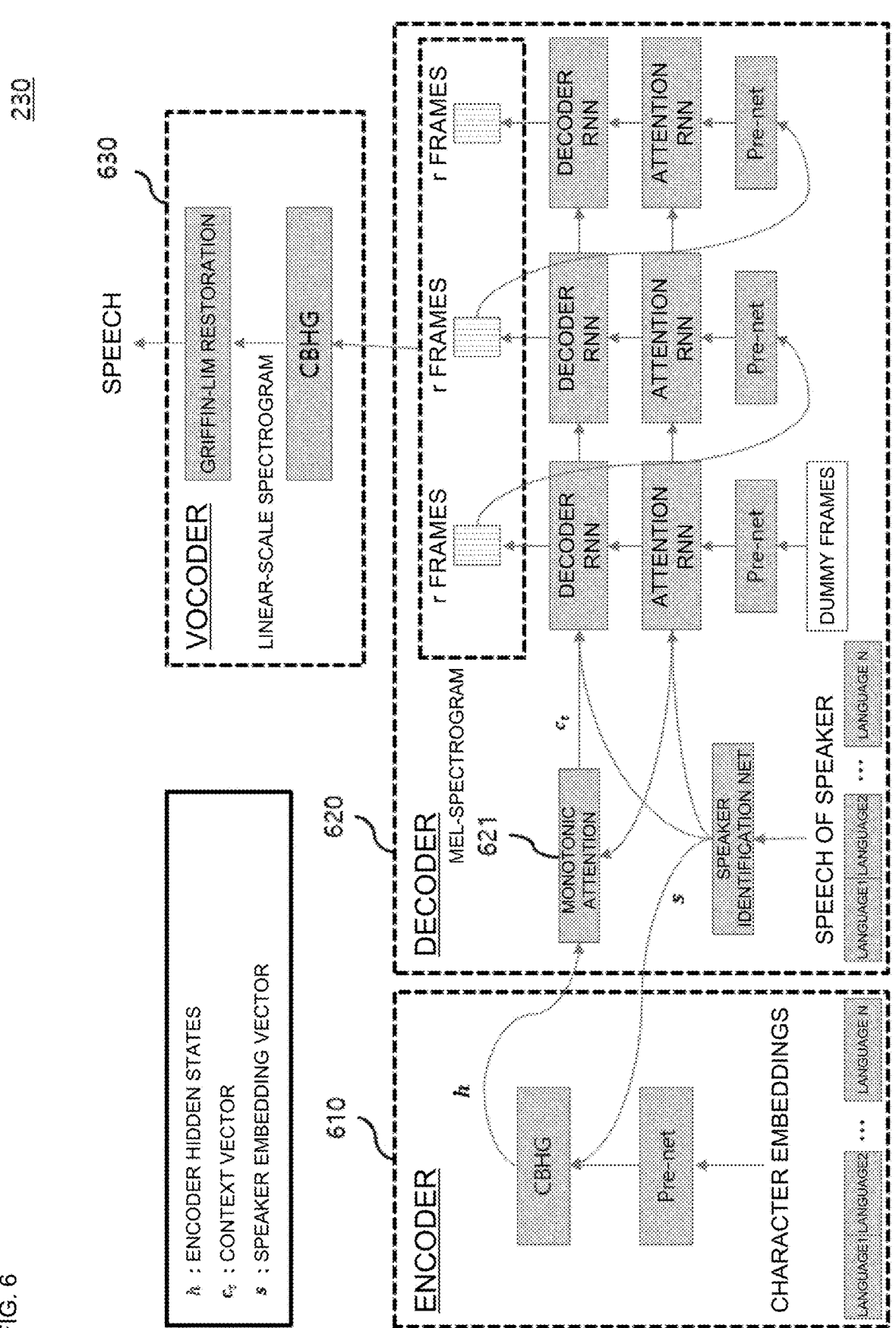
FIG. 6 is a diagram showing a configuration of an artificial neural network-based speech synthesizer for simulating voice in a specific language according to another embodiment.

FIG. 6 is a diagram showing a configuration of an artificial neural network-based speech synthesizer for simulating voice in a specific language according to another embodiment.

As shown, the speech synthesizer 230 may include an encoder 610, a decoder 620, and a vocoder 630. The encoder 610 and the decoder 620 of FIG. 6 may correspond to the encoder 310 and the decoder 330 of FIG. 3, respectively. In addition, a monotonic attention 621 included in the decoder 620 may correspond to the attention 320 of FIG. 3. Hereinafter, among configurations and functions of the encoder 610, the decoder 620, and the vocoder 630 of FIG. 6, descriptions of the same or similar configurations and functions to those of the encoder 510, the decoder 520, and the vocoder 530 of FIG. 5 will be omitted.

The decoder 620 of FIG. 6 receives the speech of a speaker, unlike the decoder 520 of FIG. 5 receiving the information of a speaker using an one-hot speaker ID. In addition, the decoder 620 may use a speaker identification net to extract feature information from the speech of the speaker. The speaker identification network may be implemented with one of various types of machine learning models that may extract features that may distinguish speakers, or a combination thereof.

In an embodiment, the speaker identification net may convert the speech of the speaker into a speaker embedding vector based on a machine learning model. The speaker embedding vector may be an embedding vector for at least one of the articulatory feature, the emotion feature, and the prosody feature of the speaker. The machine learning model of the speaker identification net may receive the speech data of a plurality of speakers regarding a plurality of different languages and perform machine learning of the articulatory features, the prosody features, the emotion features, and the like of the speakers.

The speaker identification net may output the converted speaker embedding vector s to the CBHG of the encoder 610, the decoder RNN, and the attention RNN of the decoder 620. The decoder 620 may generate a plurality of r frames based on the speaker embedding vector s and the input text. The decoder 620 may arrange a plurality of r frames in chronological order and generate the output speech data represented by mel spectrogram. The vocoder 630 may convert the output speech data represented by the mel spectrogram into a speech of the time domain.

Figure 7:
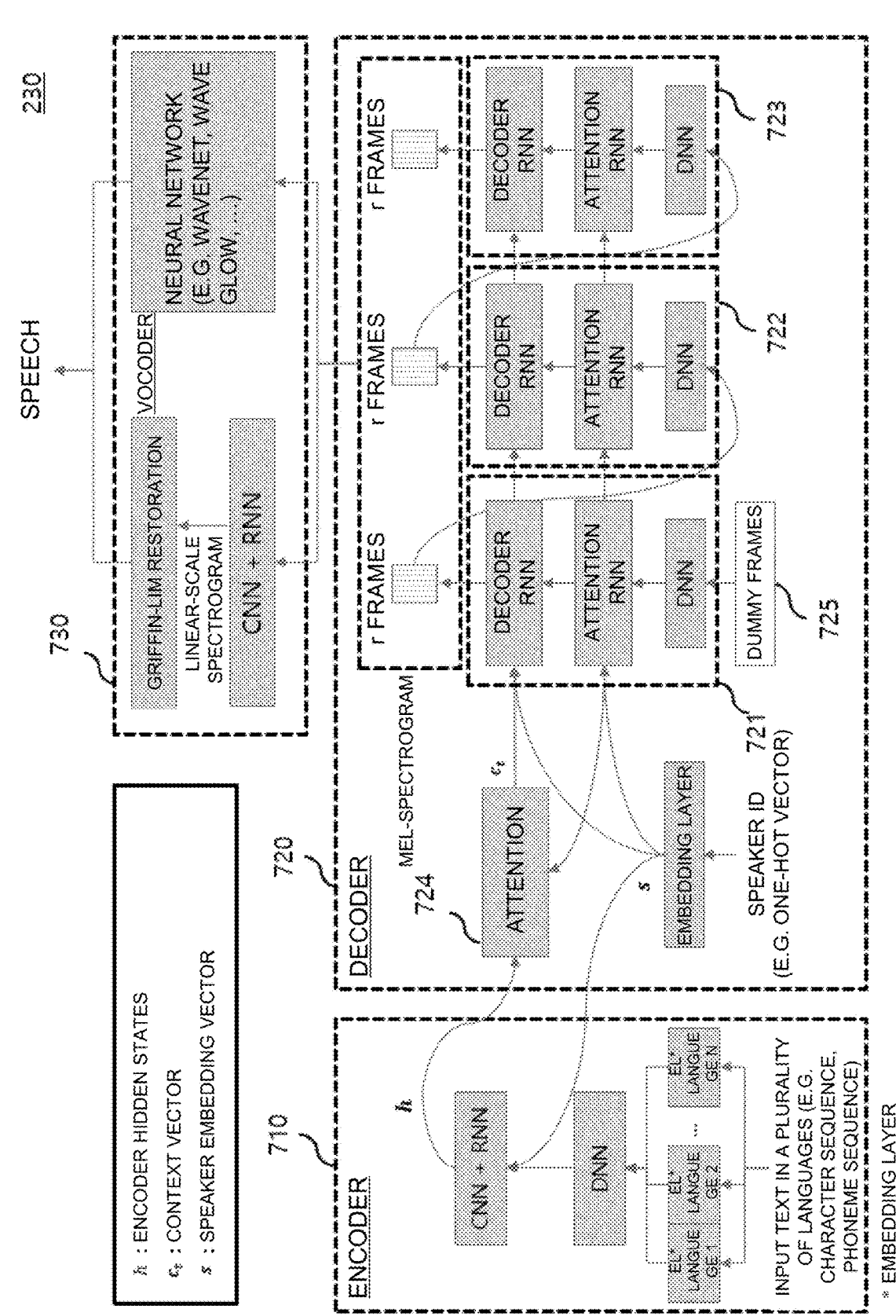
FIG. 7 is a diagram showing a configuration of an artificial neural network-based speech synthesizer for simulating voice in a specific language according to still another embodiment.

FIG. 7 is a diagram showing a configuration of an artificial neural network-based speech synthesizer for simulating voice in a specific language according to still another embodiment.

As shown, the speech synthesizer 230 may include an encoder 710, a decoder 720, and a vocoder 730. The encoder 710 and the decoder 720 of FIG. 7 may correspond to the encoder 310 and the decoder 330 of FIG. 3, respectively. In addition, the attention 724 included in the decoder 720 of FIG. 7 may correspond to the attention 320 of FIG. 3. Hereinafter, among configurations and functions of the encoder 710, the decoder 720, and the vocoder 730 of FIG. 7, descriptions of the same or similar configurations and functions to those of the encoders 510, 610, the decoders 520, 620, and the vocoder 530, 630 of FIGS. 5 and 6 will be omitted.

In FIG. 7, the encoder 710 may receive an input text. The input text received by the encoder 710 may include a text regarding a plurality of languages. For example, the input text may include a sentence such as "안녕하세요" or "How are you?" The encoder 710 may divide the received input text in units of a syllable, a character, or a phoneme. Alternatively, the encoder 710 may receive the input text divided in units of a syllable, a character, or a phoneme.

The encoder 710 may include at least one embedding layer (e.g., EL language 1, EL language 2, . . . , EL language N). At least one embedding layer of the encoder 710 may convert the input text divided in units of a syllable, a character, or a phoneme into a text embedding vector. The encoder 710 may use a pre-trained machine learning model to convert the divided input text into the text embedding vector. The encoder 710 may update the machine learning model while performing machine learning, and in this case, the text embedding vector for the divided input text may also be changed.

The encoder 710 may pass the text embedding vector through a DNN module including a fully-connected layer. The DNN may be a general feedforward layer or a linear layer.

The encoder 710 may pass the output of the DNN through a module including a combination of CNN and RNN. The CNN may capture a regional feature according to a size of a convolution kernel, and the RNN may capture long term dependency. The encoder 710 may output hidden states h of the encoder. The hidden states output from the encoder 710 may be information indicating from which input text a speech is to be synthesized.

The embedding layer of the decoder 720 may perform operations similar to those of the embedding layer of the encoder 710. The embedding layer may receive the speaker ID. The speaker ID may be a one-hot speaker ID, and in this case, it may be numbered according to the speaker by the one-hot speaker ID. For example, the speaker ID of the "first speaker" may be assigned as "1", the speaker ID of the "second speaker" as "2", and the speaker ID of the "third speaker" as "3". The embedding layer may convert the speaker ID into the speaker embedding vector s. The decoder 720 may use a pre-trained machine learning model to convert the speaker ID into the speaker embedding vector s. The decoder 720 may update the machine learning model while performing machine learning. and in this case, the speaker embedding vector s for the speaker ID may also be changed.

The attention 724 of the decoder 720 may receive hidden states h received from the encoder. In addition, the attention 724 of the decoder 720 may receive information from the attention RNN. The information received from the attention RNN may be information regarding which speeches the decoder 720 has generated up to the previous time-step. In addition, the attention 724 of the decoder 720 may output a context vector $c_t$ based on the information received from the attention RNN and the hidden states received from the encoder 710. The context vector $c_t$ may be information for determining from which part of the input text the speech is to be generated at the current time-step. For example, the attention 724 of the decoder 720 may output information for generating a speech based on the front portion of the text input at the beginning of the speech generation and generating a speech based on the rear portion of the text input as the speech is being generated.

The decoder 720 may configure the structure of the artificial neural network such that decoding is performed differently depending on the speaker by inputting the speaker embedding vector s to the attention RNN and the decoder RNN. In addition, the speech synthesizer 230 may use a database existing as a pair of text, speaker index, and speech data to learn an artificial neural network (single artificial neural network text-to-speech synthesis model). The text input may be configured as a one-hot vector in units of character. The speech synthesizer 230 may be configured as the one-hot vector that may express all the multilingual characters to receive multilingual text. In addition, the speech synthesizer 230 may additionally receive information indicating the corresponding language.

Dummy frames 725 are frames to be input to the decoder 720 when there exists no previous time-step. The RNN may perform machine learning autoregressively. That is, the r frames output at the immediately previous time-step 722 may be inputs for the current time-step 723. At an initial time-step 721, since there cannot be an immediately previous time-step, the decoder may input the dummy frames 725 into the initial time-step machine learning.

The decoder 720 may include at least one set (721, 722, 723) of a DNN including a fully connected layer, an attention RNN including a GRU, and a decoder RNN including a residual GRU. Here, the DNN may be a general feedforward layer or a linear layer. In addition, the attention RNN is a layer that outputs information to be used in the attention. The attention has been already described above, and thus a detailed description thereof will be omitted. The decoder RNN may receive position information of the input text from the attention. That is, the position information may be information regarding which location of the input text is being converted into a speech by the decoder 720. The decoder RNN may receive the information from the attention RNN. The information received from the attention RNN may be information regarding speeches the decoder 720 has generated up to the previous time-step. The decoder RNN may generate the next output speech following the output speeches that have been generated so far. The output speech may include r frames in the form of a mel-spectrogram.

For the purpose of text-to-speech synthesis, the operations of the DNN, the attention RNN, and the decoder RNN may be repeatedly performed. For example, r frames acquired at the initial time-step 721 may be inputs for a subsequent time-step 722. In addition, the r frames output at the time-step 722 may be inputs for a subsequent time-step 723.

Through the above-described process, a speech may be generated for each unit of the text. The speech synthesizer 230 may acquire a speech of the mel-spectrogram for the whole text by concatenating the mel-spectrograms for the respective time-steps in chronological order. The speech of the mel-spectrogram for the whole text may be output to the vocoder 730.

The CNN or RNN of the vocoder 730 according to an embodiment of the present disclosure may perform an operation similar to that of the CNN or RNN of the encoder. That is, the CNN or RNN of the vocoder 730 may capture a regional feature and long term dependency. The CNN or RNN of the vocoder 730 may output a linear-scale spectrogram. The linear-scale spectrogram can be a magnitude spectrogram. The vocoder 730 may predict the phase of the spectrogram through the Griffin-Lim algorithm. The vocoder 730 may output a speech signal in a time domain using the Inverse Short-Time Fourier Transform.

The vocoder 730 according to another embodiment of the present disclosure may acquire the speech signal from the mel-spectrogram based on a machine learning model. The machine learning model may be a model formed from machine learning of the correlation between the mel-spectrogram and the speech signal. For example, a model such as WaveNet or WaveGlow may be used.

The artificial neural network-based speech synthesizer 230 is trained using a large database existing as a pair of a multilingual text and a speech signal. The speech synthesizer 230 may receive a text and compare an output speech data with a target speech signal, and define a loss function. The speech synthesizer 230 may learn the loss function through an error back-propagation algorithm, and thus finally may obtain an artificial neural network that outputs a desired speech output when any text is input.

The speech synthesizer 230 may synthesize a speech that pronounces the second language in the first language style by changing the language using the single artificial neural network text-to-speech synthesis model generated in the above manner. In addition, the speech synthesizer 230 may receive the articulatory feature of the speaker and synthesize a speech according to the style of the speaker. In addition, the speech synthesizer 230 may synthesize a speech as if a speaker who utters the first language speaks the second language.

The speech synthesizer 230 may output speech data using a text, an articulatory feature of the speaker, and language information as inputs to an artificial neural network. The speech synthesizer 230 may learn by comparing the output speech data and the target speech data, and thus generate output speech data as if reading the text by simulating the speaker's speech when receiving the text and the articulatory feature of the speaker.

Figure 8:
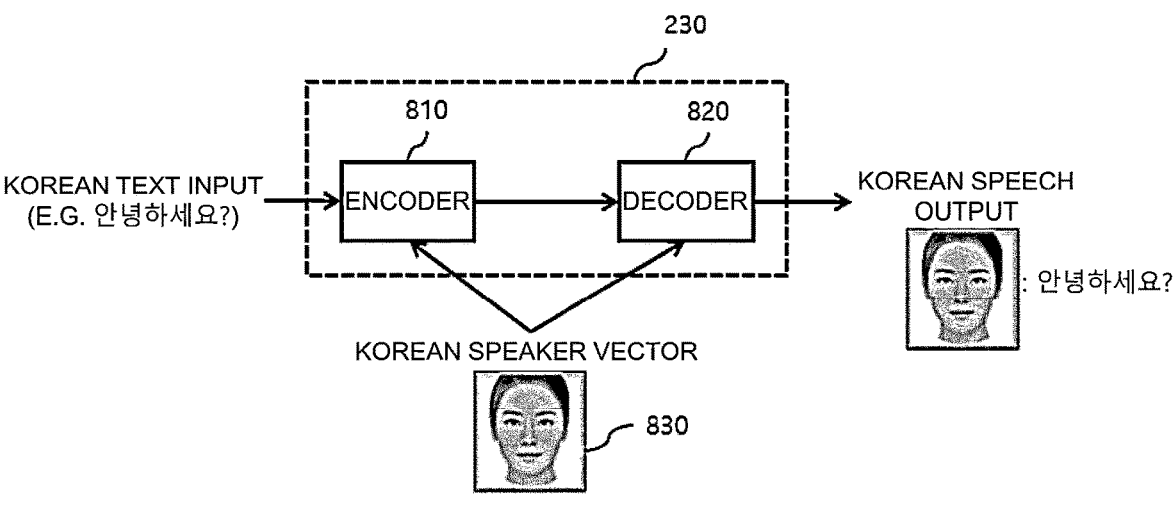
FIG. 8 is a diagram showing a method of training a single artificial neural network text-to-speech synthesis model for synthesizing multilingual speech according to an embodiment.

FIG. 8 is a diagram showing a method of training a single artificial neural network text-to-speech synthesis model for synthesizing multilingual speech according to an embodiment of the present disclosure.

As shown, a training stage for generating a single artificial neural network text-to-speech synthesis model based on a text regarding a plurality of languages and corresponding speech data may be performed based on a pair of Korean text and speech data. For example, the Korean text "안녕하세요" is input to the encoder 810, and a Korean speaker vector is input to the encoder 810 and the decoder 820. The encoder 810 and the decoder 820 may correspond to the encoders 310, 510, 610, 710 and the decoders 330, 520, 620, 720 shown in FIGS. 3 and 5 to 7. The Korean speaker vector may correspond to the speaker embedding vector s of FIGS. 5 to 7. The Korean speaker vector 830 may correspond to at least one of the articulatory feature, the prosody feature, and the emotion feature of the speaker.

As described with reference to FIGS. 3 and 5 to 7, the decoder 820 may receive information (that is, the hidden state of the encoder) indicating which text corresponds to the Korean speech output from the encoder 810. The decoder 820 may generate a Korean speech output based on the hidden state of the encoder and the Korean speaker vector. When there is a difference between the generated speech output and the actual speech, the speech synthesizer 230 may update the single artificial neural network text-to-speech synthesis model by machine learning. The speech synthesizer 230 may repeatedly update the single artificial neural network text-to-speech synthesis model so that the difference between the generated speech output and the actual speech is minimized.

Figure 9:
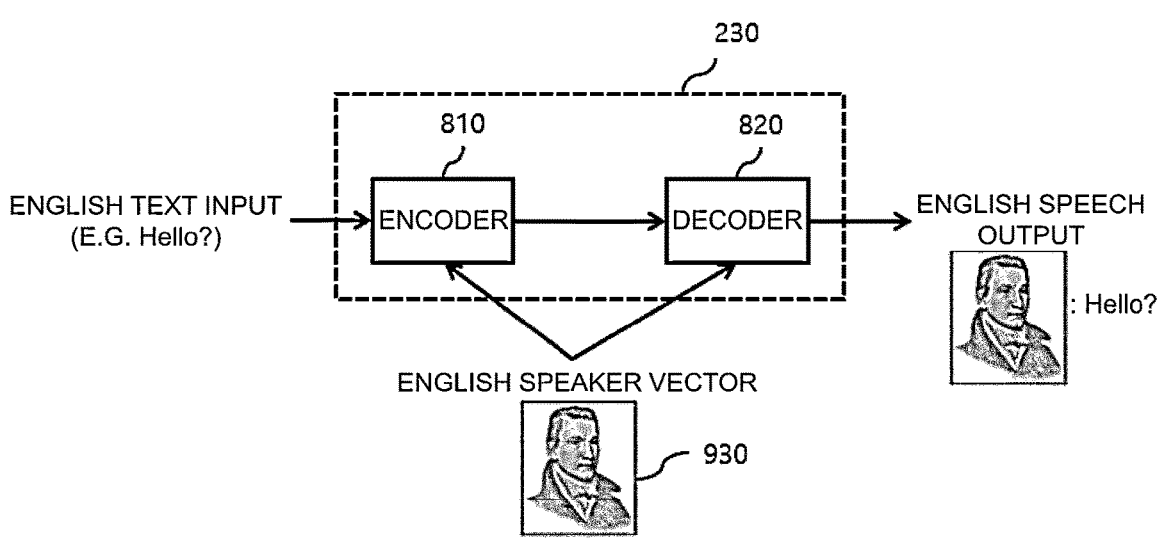
FIG. 9 is a diagram showing a method of training a single artificial neural network text-to-speech synthesis model for synthesizing multilingual speech according to an embodiment.

FIG. 9 is a diagram showing a method of training a single artificial neural network text-to-speech synthesis model for synthesizing multilingual speech according to an embodiment of the present disclosure.

As shown, a training stage for generating a single artificial neural network text-to-speech synthesis model based on a text regarding a plurality of languages and corresponding speech data, may be performed based on a pair of English text and speech data, following the training stage shown in FIG. 8. For example, the English text "Hello?" is input to the encoder 910, and an English speaker vector is input to the encoder 810 and the decoder 820.

As described with reference to FIGS. 3 and 5 to 7, the decoder 820 may receive information (that is, the hidden state of the encoder) indicating which text corresponds to English speech output from the encoder 810. The decoder 820 may generate an English speech output based on the hidden state of the encoder and the English speaker vector. When there is a difference between the generated speech output and the actual speech, the speech synthesizer 230 may update the single artificial neural network text-to-speech synthesis model by machine learning. The speech synthesizer 230 may repeatedly update the single artificial neural network text-to-speech synthesis model so that the difference between the generated speech output and the actual speech is minimized.

Figure 10:
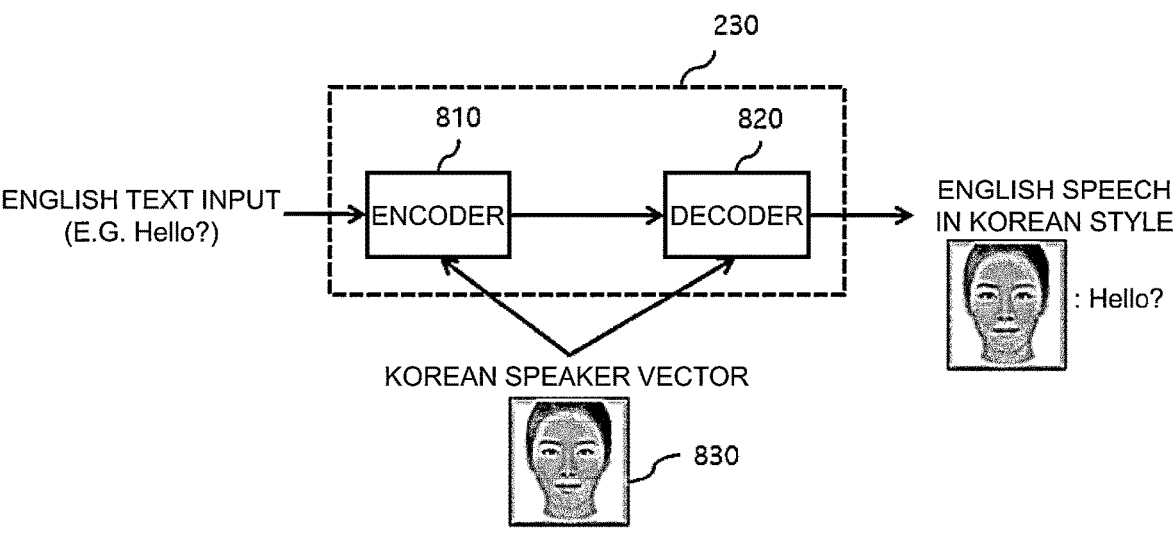
FIG. 10 is a diagram showing a method of synthesizing multilingual speech using a single artificial neural network text-to-speech synthesis model trained according to an embodiment.

The training stage by the speech synthesizer 230 of FIG. 8 and the training stage by the speech synthesizer 230 of FIG. 10 are separately illustrated, but these training stages may represent a part of the entire learning process for generating the same single artificial neural network text-to-speech synthesis model. That is, the speech synthesizer 230 may receive a text of a plurality of languages and speech data corresponding to the text of the plurality of languages, and iteratively learn the text of respective languages and corresponding speech data to generate a single artificial neural network text-to-speech synthesis model.

FIG. 10 is a diagram showing a method of synthesizing multilingual speech using a single artificial neural network text-to-speech synthesis model trained according to an embodiment of the present disclosure.

As shown, a test stage of generating a multilingual speech output by applying the single artificial neural network text-to-speech synthesis model trained according to the method shown in FIGS. 8 and 9 may be performed by inputting English text (e.g., "Hello?") into the encoder 810 and inputting a Korean speaker vector 830 into the encoder 810 and decoder 820. The Korean speaker vector may include at least one of an embedding vector for an articulatory feature, an embedding vector for a prosody feature, or an embedding vector for an emotion feature, of a speaker.

In this case, the decoder 820 may generate an English speech (e.g., "Hello?") in Korean style by applying the English text and the Korean speaker vector to the single artificial neural network text-to-speech synthesis model. The single artificial neural network text-to-speech synthesis model may be the single artificial neural network text-to-speech synthesis model generated according to the methods of FIGS. 8 and 9. The speech generated by the decoder 1020 may be a speech having an effect of pronouncing "Hello?" in English by simulating the Korean speaker's speech.

Figure 11:
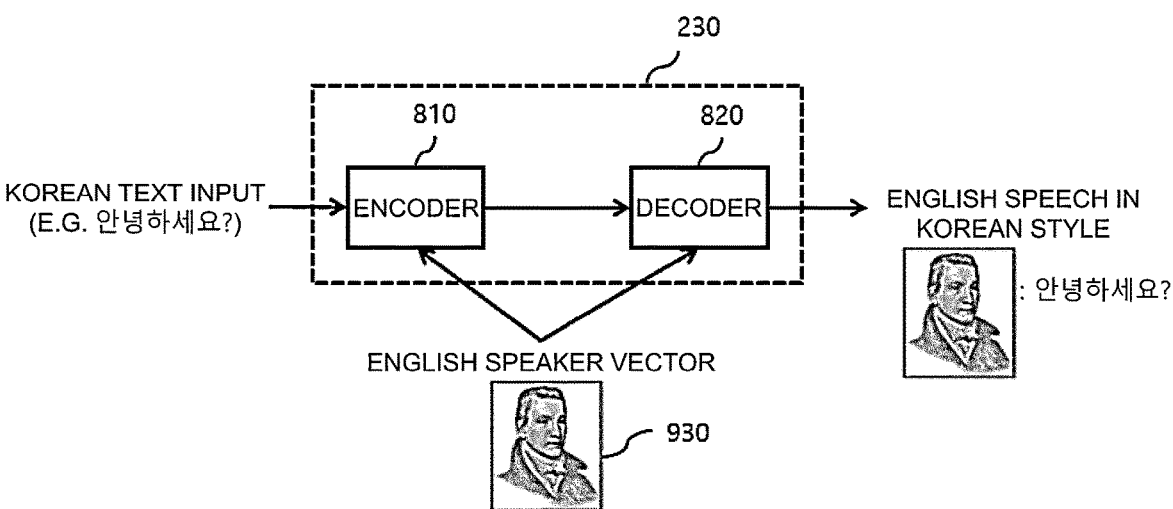
FIG. 11 is a diagram showing a method of synthesizing multilingual speech using a single artificial neural network text-to-speech synthesis model trained according to an embodiment.

FIG. 11 is a diagram showing a method of synthesizing multilingual speech using a single artificial neural network text-to-speech synthesis model trained according to an embodiment of the present disclosure.

As shown, a test stage of generating a multilingual speech output by applying the single artificial neural network text-to-speech synthesis model trained according to the method shown in FIGS. 8 and 9 may be performed by inputting Korean text (e.g., " 안녕하세요 ?") into the encoder 810 and inputting a English speaker vector 930 into the encoder 810 and the decoder 820. The English speaker vector may include at least one of an embedding vector for an articulatory feature, an embedding vector for a prosody feature, or an embedding vector for an emotion feature, of a speaker.

In this case, the decoder 820 may generate an Korean speech (e.g., " 안녕하세요 ?") in English style by applying the Korean text and the English speaker vector to the single artificial neural network text-to-speech synthesis model. The single artificial neural network text-to-speech synthesis model may be the single artificial neural network text-to-speech synthesis model generated according to the methods of FIGS. 8 and 9. The speech generated by the decoder 820 may be a speech having an effect of pronouncing " 안녕하세요 ?" in Korean by simulating an English speaker's speech.

Figure 12:
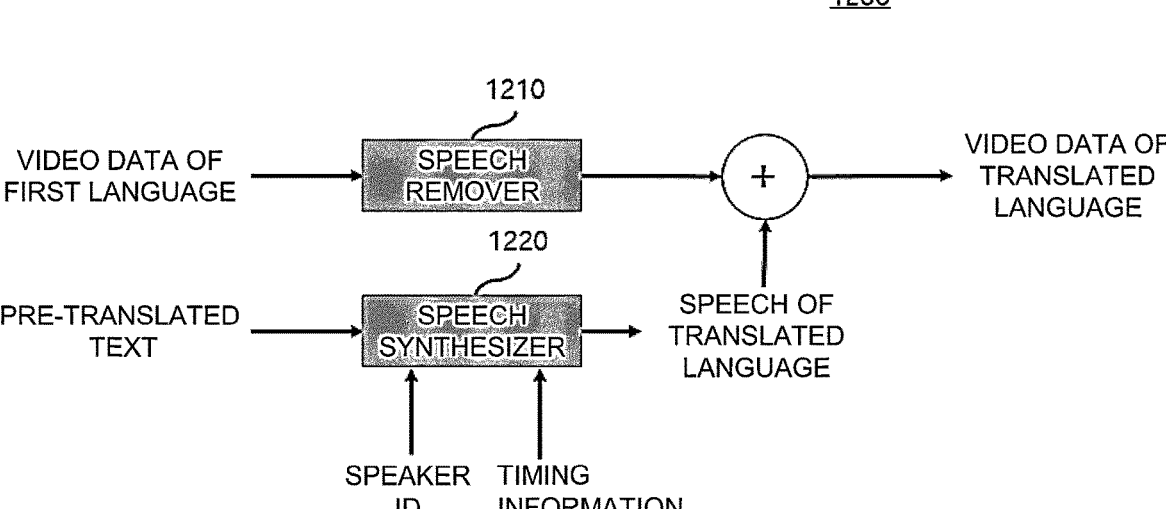
FIG. 12 is a block diagram showing a configuration of a video translation system according to an embodiment.

FIG. 12 is a block diagram showing a configuration of a video translation system according to an embodiment of the present disclosure.

As shown, the video translation system 1200 may include a speech remover 1210 and a speech synthesizer 1220. The speech synthesizer 1220 may correspond to the speech synthesizer 230 of FIGS. 2 to 11.

The video translation system 1200 may perform a step of acquiring a single artificial neural network text-to-speech synthesis model trained based on a learning text of a first language and learning speech data of the first language corresponding to the learning text of the first language, and a learning text of a second language and learning speech data of the second language corresponding to the learning text of the second language. The video translation system 1200 may store a single artificial neural network text-to-speech synthesis model in a memory. Alternatively, the video translation system 1200 may receive a single artificial neural network text-to-speech synthesis model through the network.

The speech remover 1210 may receive video data of the first language. The video data of the first language may include input speech data of the first language. The speech remover 1210 may output video data obtained by removing input speech of the first language from the video data of the first language.

The speech synthesizer 1220 may receive a pre-translated text. The pre-translated text may be text obtained by converting the first language input speech data into a text of the first language having the same or similar meaning, and then translating the text of the first language into a corresponding text of the second language. For example, the pre-translated text may be subtitle data of the second language included in video data of the first language.

The speech synthesizer 1220 may receive a speaker ID and timing information. In an embodiment, the speaker ID may indicate the articulatory feature of the speaker of the speech data included in the video data of the first language, or may indicate the articulatory feature of another speaker who uses the first language. For example, the speaker ID may be extracted from the speech data uttered by a third speaker (for example, celebrities whose voices are known, such as entertainers and politicians) other than the speaker of the speech data included in video data of the first language.

Here, the speaker ID may correspond to the speaker embedding vector s of FIGS. 5 to 7. The speaker ID may indicate an embedding vector corresponding to a specific speaker (e.g., a speaker regarding the first language). Accordingly, the speech synthesizer 1220 may generate a speech that simulates the specific speaker's voice based on the speaker ID. Meanwhile, the timing information may be information indicating a time at which the pre-translated text is to be displayed together with the video data. Alternatively, the timing information may be information indicating a time at which the speech of the second language corresponding to the pre-translated text is to be displayed together with the video data. The speech synthesizer 1220 may acquire the speech of the translated language by applying the pre-translated text and the speaker ID to the single artificial neural network text-to-speech synthesis model. The video translation system 1200 may combine a speech of a translated language and video data from which the speech is removed, based on the timing information. Accordingly, the video data combined with the speech of the translated language may include the speech of the second language.

Figure 13:
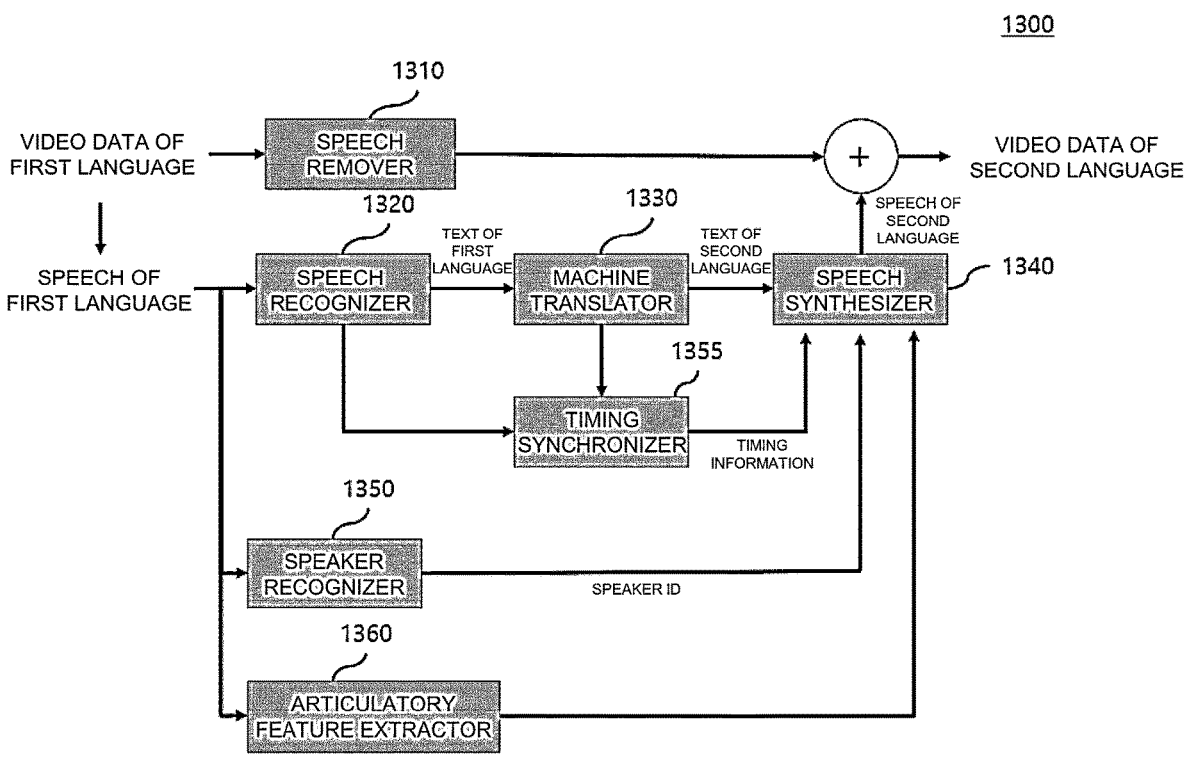
FIG. 13 is a block diagram showing a configuration of a video translation system according to another embodiment.

FIG. 13 is a block diagram showing a configuration of a video translation system according to another embodiment of the present disclosure.

As shown, the video translation system 1300 may include a speech remover 1310, a speech recognizer 1320, a machine translator 1330, a speech synthesizer 1340, a speaker recognizer 1350, a timing synchronizer 1355, and an articulatory feature extractor 1360.

The speech remover 1310 and the speech synthesizer 1340 of FIG. 13 may correspond to the speech remover 1210 and the speech synthesizer 1220 of FIG. 12, respectively. Therefore, in a description of FIG. 13, portions overlapping with those described above with reference to FIG. 12 will not be described.

The video translation system 1300 may perform a step of acquiring a single artificial neural network text-to-speech synthesis model trained based on a learning text of a first language and learning speech data of the first language corresponding to the learning text of the first language, and a learning text of a second language and learning speech data of the second language corresponding to the learning text of the second language. The video translation system 1300 may store a single artificial neural network text-to-speech synthesis model in a memory. Alternatively, the video translation system 1300 may receive a single artificial neural network text-to-speech synthesis model through the network.

The video translation system 1300 may perform a step of receiving video data including input speech data of the first language, a text of the first language corresponding to the input speech data of the first language, and an articulatory feature of a speaker regarding the first language.

Referring to FIG. 13, the speech remover 1310 may receive video data of the first language. The video data of the first language may be video data including input speech data of the first language. The speech remover 1310 may perform a step of deleting the input speech data of the first language from the video data.

The video translation system 1300 may extract the input speech data of the first language from the video data of the first language. The speech recognizer 1320 may convert the input speech data of the first language into a text of the first language. The machine translator 1330 may perform a step of converting the text of the first language into a text of the second language. The speech recognizer 1320 and the machine translator 1330 may correspond to the speech recognizer 210 and the machine translator 220 of FIG. 2, respectively.

The speaker recognizer 1350 may acquire a speaker ID based on a speech of the first language. According to an embodiment, the speaker recognizer 1350 may be acquired from a pre-trained machine learning model. The machine learning model may be a model having acquired machine learning based on the speeches of a plurality of speakers. The speaker recognizer 1350 may generate a speaker ID by applying the speech of the first language to the machine learning model. The speaker ID may be an embedding vector corresponding to a specific speaker. According to another embodiment, the speaker recognizer 1350 may not use a machine learning model. The speaker recognizer 1350 may select a speaker ID for a speech of the speaker most similar to the speech of the first language from the database.

The timing synchronizer 1355 may generate and output timing information based on the speech and the position information of a text output from the speech recognizer 1320 and the machine translator 1330. The timing information may be information indicating a time at which the speech of the second language corresponding to the speech of the first language is to be played together with the video data.

The articulatory feature extractor 1360 may acquire an articulatory feature of the speaker regarding the first language from the speech of the first language. As already described, the articulatory feature of the speaker may include at least one of a voice tone of articulation of the speaker or a voice pitch of the articulation of the speaker.

The speech synthesizer 1340 may perform a step of generating output speech data for the text of the second language that simulates the speaker's speech by inputting the text of the second language and the articulatory feature of the speaker regarding the first language to the single artificial neural network text-to-speech synthesis model. The video translation system 1300 may perform a step of combining the output speech data with the video data from which the speech is removed by the speech remover 1310.

The speech synthesizer 1340 may perform a step of generating output speech data for the text of the second language that simulates the speaker's speech by inputting the text of the second language, speaker ID, and the articulatory feature of the speaker regarding the first language to the single artificial neural network text-to-speech synthesis model.

The video translation system 1300 may output video data including the speech of the second language that simulates an articulatory feature of the speaker regarding the first language. That is, the speech of the second language may be a speech as if speaking in the second language by simulating the speaker's speech regarding the first language.

Figure 14:
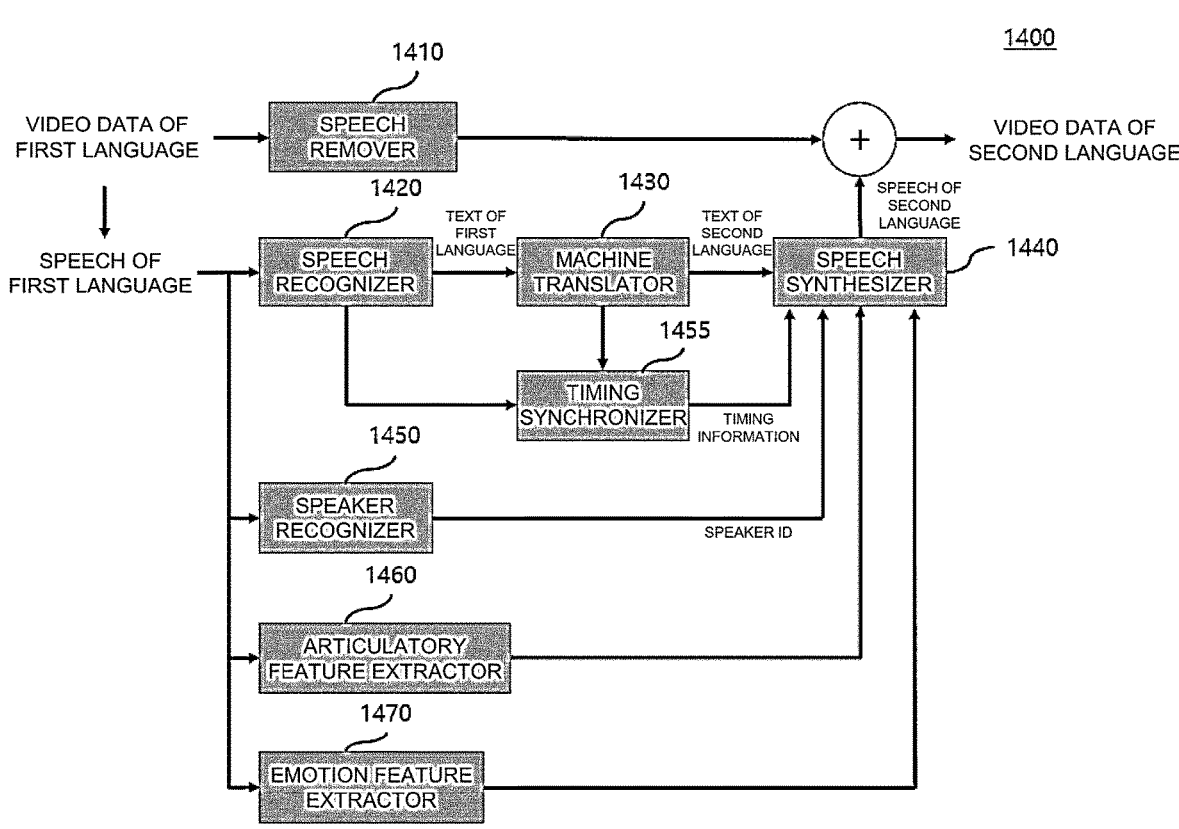
FIG. 14 is a block diagram showing a configuration of a video translation system according to still another embodiment.

FIG. 14 is a block diagram showing a configuration of a video translation system according to still another embodiment of the present disclosure.

Referring to FIG. 14, the video translation system 1400 may include a speech remover 1410, a speech recognizer 1420, a machine translator 1430, a speech synthesizer 1440, a speaker recognizer 1450, a timing synchronizer 1455, an articulatory feature extractor 1460, and an emotion feature extractor 1470. The speech remover 1410, the speech recognizer 1420, the machine translator 1430, the speech synthesizer 1440, the speaker recognizer 1450, the timing synchronizer 1455, and the articulatory feature extractor 1460 of FIG. 14 may correspond to the speech remover 1310, the speech recognizer 1320, the machine translator 1330, the speech synthesizer 1340, the speaker recognizer

1350, the timing synchronizer 1355 and the articulatory feature extractor 1360 of FIG. 13, respectively. Therefore, in a description of FIG. 14, portions overlapping with those described above with reference to FIG. 13 will not be described.

The video translation system 1400 may further include an emotion feature extractor 1470. The emotion feature extractor 1470 may generate an emotion feature of the speaker regarding the first language from input speech data of the first language. The emotion feature extractor 1470 may correspond to the emotion feature extractor 250 of FIG. 2.

The speech synthesizer 1440 may generate output speech data for a text of a second language that simulates the speaker's speech. The speech synthesizer 1440 may perform a step of generating output speech data for the text of the second language that simulates the speaker's speech by inputting the text of the second language and the articulatory feature and emotion feature of the speaker regarding the first language to the single artificial neural network text-to-speech synthesis model.

Figure 15:
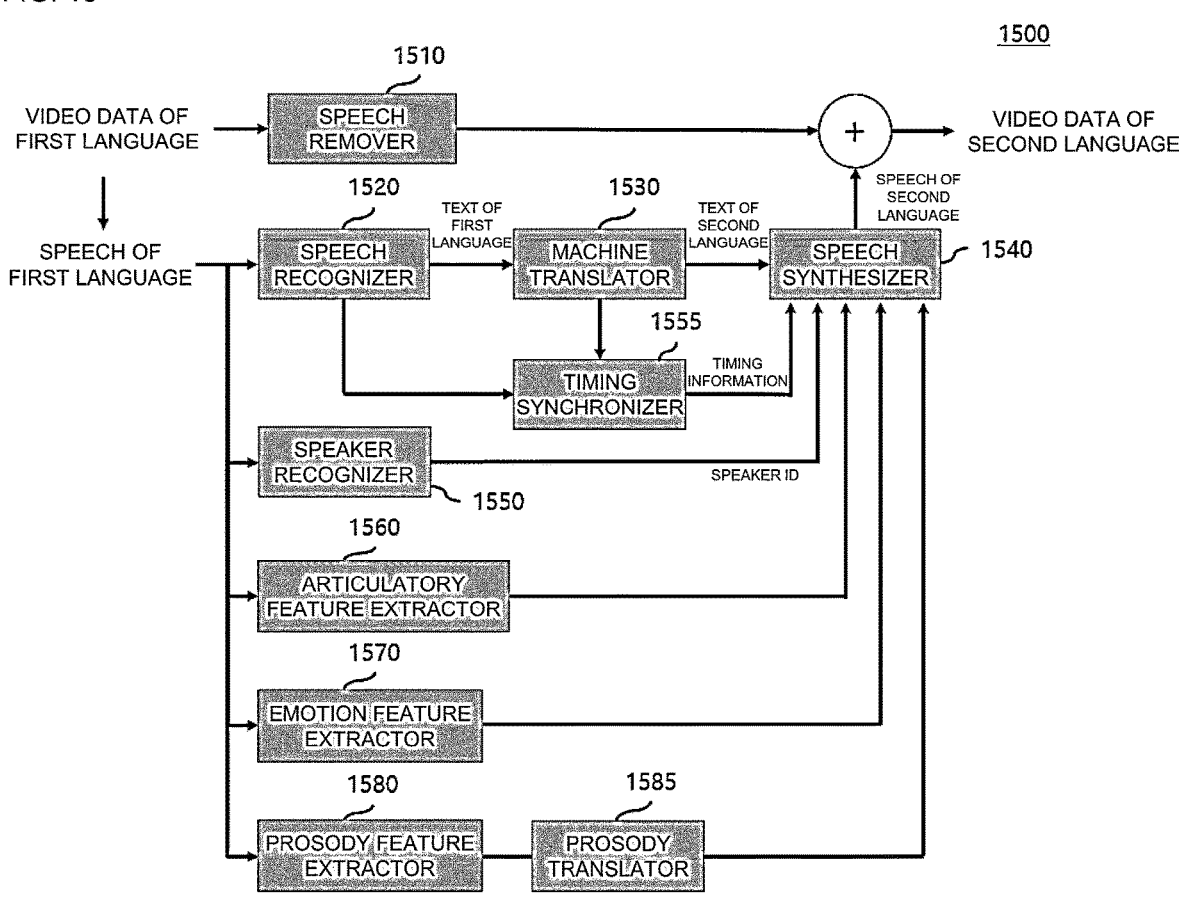
FIG. 15 is a block diagram showing a configuration of a video translation system according to still another embodiment.

FIG. 15 is a block diagram showing a configuration of a video translation system according to still another embodiment of the present disclosure.

Referring to FIG. 15, the video translation system 1500 may include a speech remover 1510, a speech recognizer 1520, a machine translator 1530, a speech synthesizer 1540, a speaker recognizer 1550, a timing synchronizer 1555, an articulatory feature extractor 1560, an emotion feature extractor 1570, a prosody feature extractor 1580, and a prosody translator 1585. The speech remover 1510, the speech recognizer 1520, the machine translator 1530, the speech synthesizer 1540, the speaker recognizer 1550, the timing synchronizer 1555, the articulatory feature extractor 1560, and the emotion feature extractor 1570 of FIG. 15 may correspond to the speech remover 1410, the speech recognizer 1420, the machine translator 1430, the speech synthesizer 1440, the speaker recognizer 1450, the timing synchronizer 1455, the articulatory feature extractor 1460, and the emotion feature extractor 1470 of FIG. 14, respectively. Therefore, in a description of FIG. 15, portions overlapping with those described above with reference to FIG. 14 will not be described.

The video translation system 1500 may further include a prosody feature extractor 1580. The prosody feature extractor 1580 may perform a step of generating a prosody feature of the speaker regarding the first language from the input speech data of the first language. The prosody feature extractor 1580 may correspond to the prosody feature extractor 260 of FIG. 2.

In addition, the video translation system 1500 may further include a prosody translator 1585 that receives a prosody feature regarding the first language output from the prosody feature extractor 1580 and generates a prosody feature regarding a second language. As shown, the prosody translator 1585 may receive the prosody feature extracted from speech data of the first language by the prosody feature extractor 1580. The prosody translator 1585 may convert the prosody feature extracted from speech data of the first language into a prosody feature of the output speech of the second language. In this way, when the prosody translator 1585 extracts the prosody feature of the speaker from the input speech of the first language and translates it into the prosody feature of the second language, features such as speaking speed, pauses while reading, emphasis of the speech of the first language, may be reflected in the output speech of the second language.

In addition, the speech synthesizer 1540 may generate output speech data for a text of the second language that simulates the speaker's speech. In addition, the speech synthesizer 1540 may perform a step of generating output speech data for the text of the second language that simulates the speaker's speech by inputting the text of the second language and the articulatory feature, the emotion feature, and the prosody feature of the speaker regarding the first language to the single artificial neural network text-to-speech synthesis model.

FIG. 16 is a flowchart showing a speech translation method 1600 according to an embodiment of the present disclosure.

The speech translator 120 may translate a speech using a multilingual text-to-speech synthesis model. The speech translator 120 may perform a step 1610 of acquiring a single artificial neural network text-to-speech synthesis model trained based on a learning text of a first language and learning speech data of the first language corresponding to the learning text of the first language, and a learning text of a second language and learning speech data of the second language corresponding to the learning text of the second language. The speech translator 120 may perform a step 1620 of receiving input speech data of the first language and an articulatory feature of a speaker regarding the first language. The speech translator 120 may perform a step 1630 of converting the input speech data of the first language into a text of the first language. The speech translator 120 may perform a step 1640 of converting the text of the first language into a text of the second language. The speech translator 120 may perform a step 1650 of generating output speech data for the text of the second language that simulates the speaker's speech by inputting the text of the second language and the articulatory feature of the speaker to the single artificial neural network text-to-speech synthesis model.

FIG. 17 is a flowchart showing a video translation method 1700 according to an embodiment of the present disclosure.

The speech translator 120 may translate a speech of video data using a multilingual text-to-speech synthesis model. The speech translator 120 may perform a step 1710 of acquiring a single artificial neural network text-to-speech synthesis model trained based on a learning text of a first language and learning speech data of the first language corresponding to the learning text of the first language, and a learning text of a second language and learning speech data of the second language corresponding to the learning text of the second language. The speech translator 120 may perform a step 1720 of receiving video data including input speech data of the first language, a text of the first language corresponding to the input speech data of the first language, and an articulatory feature of a speaker regarding the first language. The speech translator 120 may perform a step 1730 of deleting the input speech data of the first language from the video data. The speech translator 120 may perform a step 1740 of converting a text of the first language into a text of the second language. It may perform a step 1750 of generating output speech data for the text of the second language that simulates the speaker's speech by inputting the text of the second language and the articulatory feature of the speaker regarding the first language to the single artificial neural network text-to-speech synthesis model. The speech translator 120 may perform a step 1760 of combining the output speech data with the video data.

Figure 18:
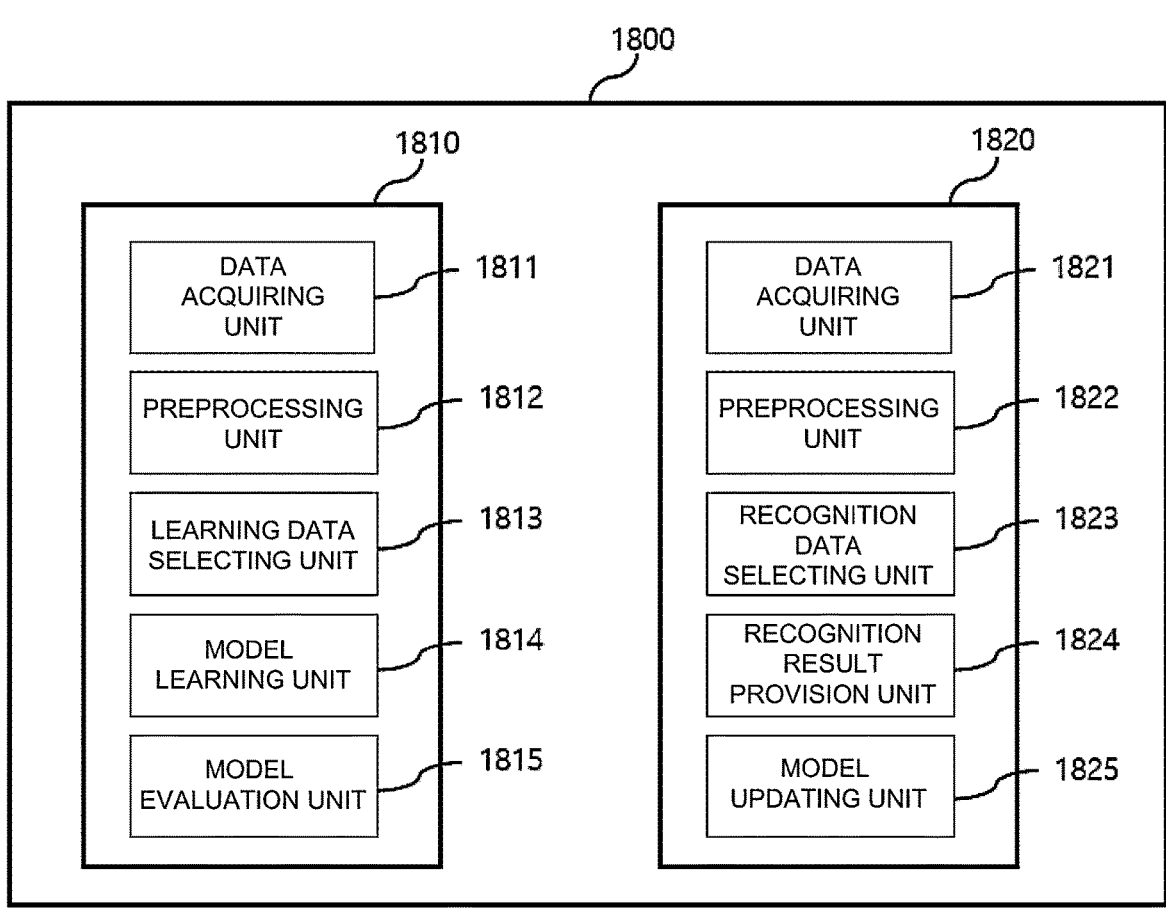
FIG. 18 is a block diagram of a text-to-speech synthesis system according to an embodiment.

FIG. 18 is a block diagram showing a text-to-speech synthesis system 1800 according to an embodiment of the present disclosure.

Referring to FIG. 18, the text-to-speech synthesis system 1800 according to an embodiment may include a data learning unit 1810 and a data recognition unit 1820. Each of the data learning unit 1810 and the data recognition unit 1820 may correspond to the speech synthesizer based on an artificial neural network, among the components of the speech translation system 100 and the video translation systems 1200, 1300, 1400, and 1500 according to various embodiments described above. Additionally, the text-to-speech synthesis system 1800 may include a processor and a memory.

The data learning unit 1810 may learn a speech for a text. The data learning unit 1810 may learn a criterion on which speech is to be output according to the text. Also, the data learning unit 1810 may learn a criterion on which speech feature is to be used to output the speech. The speech feature may include at least one of a phoneme pronunciation and a user's tone, intonation, or accent. The data learning unit 1810 may learn a speech for a text by acquiring data to be used for the learning and by applying the acquired data to a data learning model to be described below.

The data recognition unit 1820 may output a speech for a text based on the text. The data recognition unit 1820 may output a speech from a predetermined text using the learned data learning model. The data recognition unit 1820 may acquire a predetermined text (data) according to a predetermined criterion by the learning. Also, the data recognition unit 1820 may output a speech based on the predetermined data by setting the acquired data as an input value and using the data learning model. Also, a result value that is output by the data learning model using the acquired data as an input value may be used to update the data learning model.

At least one of the data learning unit 1810 or the data recognition unit 1820 may be manufactured in the form of at least one hardware chip and mounted on an electronic apparatus. For example, at least one of the data learning unit 1810 or the data recognition unit 1820 may be manufactured in the form of an artificial intelligence (AI)-dedicated hardware chip or a portion of a conventional general-purpose processor (e.g., a CPU or an application processor) or a graphics processor (e.g., a GPU) and thus may be mounted on various electronic apparatuses that have been described above.

Also, the data learning unit 1810 and the data recognition unit 1820 may be mounted on separate electronic apparatuses. For example, one of the data learning unit 1810 and the data recognition unit 1820 may be included in an electronic apparatus, and the other may be included in a server. Also, the following operations may be performed between the data learning unit 1810 and the data recognition unit 1820 in a wired or wireless manner. Model information established by the data learning unit 1810 may be provided to the data recognition unit 1820, and data input to the data recognition unit 1820 may be provided to the data learning unit 1810 as additional learning data.

Meanwhile, at least one of the data learning unit 1810 or the data recognition unit 1820 may be implemented as a software module. When at least one of the data learning unit 1810 or the data recognition unit 1820 is implemented as a software module (or a program module including instructions), the software module may be stored in a memory or a non-transitory computer-readable medium. Also, in this case, at least one software module may be provided by an operating system (OS) or may be provided by a predetermined application. Unlike this, some of the at least one software module may be provided by an OS, and the others may be provided by a predetermined application.

The data learning unit 1810 according to an embodiment of the present disclosure may include a data acquisition unit 1811, a pre-processing unit 1812, a learning data selection unit 1813, a model learning unit 1814, and a model evaluation unit 1815.

The data acquisition unit 1811 may acquire data necessary for machine learning. Since much data is needed for the learning, the data acquisition unit 1811 may receive a plurality of texts and speeches corresponding to the texts.

The pre-processing unit 1812 may pre-process the acquired data such that the acquired data can be used for machine learning in order to determine the user's mental state. The pre-processing unit 1812 may process the acquired data in a predetermined format such that the model learning unit 1814 to be described below can use the data. For example, the pre-processing unit 1812 may morphologically analyze a text and a speech to acquire a morpheme embedding.

The learning data selection unit 1813 may select data necessary for learning from the pre-processed data. The selected data may be provided to the model learning unit 1814. The learning data selection unit 1813 may select data necessary for learning from the pre-processed data according to a predetermined criterion. Also, the learning data selection unit 1813 may select data according to the predetermined criterion through learning by the model learning unit 1814 to be described below.

The model learning unit 1814 may learn a criterion on which speech is to be output depending on the text based on the learning data. Also, the model learning unit 1814 may perform learning by using a learning model for outputting a speech according to a text as the learning data. In this case, the data learning model may include a pre-established model. For example, the data learning model may include a model pre-built by receiving basic learning data (e.g., a sample image).

The data learning model may be built in consideration of an application of the learning model, a purpose of the learning, computer performance of an apparatus, or the like. The data learning model may include, for example, a model based on a neural network. For example, a model such as Deep Neural Network (DNN), Recurrent Neural Network (RNN), Long Short-Term Memory models (LSTM), Bidirectional Recurrent Deep Neural Network (BRDNN), and Convolutional Neural Network (CNN) may be used as the data learning model. However, the present invention is not limited thereto.

According to various embodiments, when a plurality of pre-built data learning models are present, the model learning unit 1814 may determine a data learning model having a large correlation between the input learning data and the basic learning data as a data learning model to be learned. In this case, the basic learning data may be pre-classified for each data type, and the data learning model may be pre-built for each data type. For example, the basic learning data may be pre-classified according to various criteria such as a region where the learning data is generated, a time when the learning data is generated, the size of the learning data, the genre of the learning data, the creator of the learning data, the types of objects in the learning data, and the like.

Also, the model learning unit 1814 may train the data learning model using, for example, a learning algorithm including error back propagation or gradient descent.

Also, the model learning unit 1814 may learn the data learning model through, for example, supervised learning having the learning data as an input value.

Also, by self-learning the type of data necessary for situation determination without any supervision, the model learning unit 1814 may learn the data learning model through, for example, unsupervised learning that finds a criterion for the situation determination. Also, the model learning unit 1814 may learn the data learning model through, for example, reinforcement learning using feedback to whether the result of the situation determination according to the learning is correct.

Also, when the data learning model is learned, the model learning unit 1814 may store the learned data learning model. In this case, the model learning unit 1814 may store the learned data learning model in a memory of an electronic apparatus including the data recognition unit 1820. Alternatively, the model learning unit 1814 may store the learned data learning model in a memory of a server connected to an electronic apparatus over a wired or wireless network.

In this case, for example, instructions or data associated with at least one another element of the electronic apparatus may also be stored in the memory where the learned data learning model is stored. Also, the memory may store software and/or a program. The program may include, for example, a kernel, middleware, an application, an application programming interface (API), and/or an application program (or an "application").

The model evaluation unit 1815 inputs evaluation data to the data learning model. When a result output from the evaluation data does not satisfy a predetermined criterion, the model evaluation unit 1815 may allow the model learning unit 1814 to perform learning again. In this case, the evaluation data may include data predetermined to evaluate the data learning model.

For example, the model evaluation unit 1815 may evaluate that the predetermined criterion is not satisfied when the number or ratio of pieces of the evaluation data which are incorrect for a recognition result with respect to a result of the evaluation data by the learned data learning model exceeds a predetermined threshold. For example, when the predetermined criterion is defined as a ratio of 2% and the learned data learning model outputs incorrect recognition results for more than 20 pieces of evaluation data out of a total of 1000 pieces of evaluation data, the model evaluation unit 1815 may evaluate that the learned data learning model is not appropriate.

Meanwhile, when a plurality of learned data learning models are present, the model evaluation unit 1815 may evaluate whether each of the learned video learning model satisfies a predetermined criterion and may determine a model satisfying the predetermined criterion as a final data learning model. In this case, when a plurality of models satisfy the predetermined criterion, the model evaluation unit 1815 may determine any predetermined model or a predetermined number of models as the final data learning model in order of highest to lowest evaluation scores.

Meanwhile, at least one of the data acquisition unit 1811, the pre-processing unit 1812, the learning data selection unit 1813, the model learning unit 1814, or the model evaluation unit 1815 in the data learning unit 1810 may be manufactured in the form of at least one hardware chip and mounted on an electronic apparatus. For example, at least one of the data acquisition unit 1811, the pre-processing unit 1812, the learning data selection unit 1813, the model learning unit 1814, or the model evaluation unit 1815 may be manufactured in the form of an AI-dedicated hardware chip or a portion of a conventional general-purpose processor (e.g., a CPU or an application processor) or a graphics processor (e.g., a GPU) and thus may be mounted on various electronic apparatuses that have been described above.

Also, the data acquisition unit 1811, the pre-processing unit 1812, the learning data selection unit 1813, the model learning unit 1814, and the model evaluation unit 1815 may be mounted on any electronic apparatus or separate electronic apparatuses. For example, some of the data acquisition unit 1811, the pre-processing unit 1812, the learning data selection unit 1813, the model learning unit 1814, and the model evaluation unit 1815 may be included in an electronic apparatus, and the others may be included in a server.

Also, at least one of the data acquisition unit 1811, the pre-processing unit 1812, the learning data selection unit 1813, the model learning unit 1814, or the model evaluation unit 1815 may be implemented as a software module. When at least one of the data acquisition unit 1811, the pre-processing unit 1812, the learning data selection unit 1813, the model learning unit 1814 or the model evaluation unit 1815 is implemented as a software module (or a program module including instructions), the software module may be stored in a non-transitory computer-readable medium. Also, in this case, at least one software module may be provided by an OS or may be provided by a predetermined application. Unlike this, some of the at least one software module may be provided by an operating system (OS), and the others may be provided by a predetermined application.

The data recognition unit 1820 according to an embodiment of the present disclosure may include a data acquisition unit 1821, a pre-processing unit 1822, a recognition data selection unit 1823, a recognition result provision unit 1824, and a model update unit 1825.

The data acquisition unit 1821 may acquire a text necessary to output a speech. On the contrary, the data acquisition unit 1821 may acquire a speech necessary to output a text. The pre-processing unit 1822 may pre-process the acquired data such that the data acquired to output the speech or text can be used. The pre-processing unit 1822 may process the acquired data in a predetermined format such that the recognition result provision unit 1824 to be described below can use the data acquired to output the speech or text.

The recognition data selection unit 1823 may select data necessary to output the speech or text from the pre-processed data. The selected data may be provided to the recognition result provision unit 1824. The recognition data selection unit 1823 may select all or some of the preprocessed data according to a predetermined criterion for outputting the speech or text. Also, the recognition data selection unit 1823 may select data according to the predetermined criterion through learning by the model learning unit 1814.

The recognition result provision unit 1824 may output a speech or text by applying the selected data to the data learning model. The recognition result provision unit 1824 may apply the selected data to the data learning model by using the data selected by the recognition data selection unit 1823 as an input value. Also, the recognition result may be determined by the data learning model.

The model update unit 1825 may enable the data learning model to be updated based on the evaluation of the recognition result provided by the recognition result provision unit 1824. For example, the model update unit 1825 may enable the model learning unit 1814 to update the data learning model by providing the recognition result provided by the recognition result provision unit 1824 to the model learning unit 1814.

Meanwhile, at least one of the data acquisition unit 1821, the pre-processing unit 1822, the recognition data selection unit 1823, the recognition result provision unit 1824, or the model update unit 1825 in the data recognition unit 1820 may be manufactured in the form of at least one hardware chip and mounted on an electronic apparatus. For example, at least one of the data acquisition unit 1821, the pre-processing unit 1822, the recognition data selection unit 1823, the recognition result provision unit 1824, or the model update unit 1825 may be manufactured in the form of an AI-dedicated hardware chip or a portion of a conventional general-purpose processor (e.g., a CPU or an application processor) or a graphics processor (e.g., a GPU) and thus may be mounted on various electronic apparatuses that have been described above.

Also, the data acquisition unit 1821, the pre-processing unit 1822, the recognition data selection unit 1823, the recognition result provision unit 1824, and the model update unit 1825 may be mounted on any electronic apparatus or separate electronic apparatuses. For example, some of the data acquisition unit 1821, the pre-processing unit 1822, the recognition data selection unit 1823, the recognition result provision unit 1824, and the model update unit 1825 may be included in an electronic apparatus, and the others may be included in a server.

Also, at least one of the data acquisition unit 1821, the pre-processing unit 1822, the recognition data selection unit 1823, the recognition result provision unit 1824, and the model update unit 1825 may be implemented as a software module. When at least one of the data acquisition unit 1821, the pre-processing unit 1822, the recognition data selection unit 1823, the recognition result provision unit 1824, or the model update unit 1825 is implemented as a software module (or a program module including instructions), the software module may be stored in a non-transitory computer-readable medium. Also, in this case, at least one software module may be provided by an OS or may be provided by a predetermined application. Unlike this, some of the at least one software module may be provided by an operating system (OS), and the others may be provided by a predetermined application.

The present disclosure has been particularly shown and described with reference to various embodiments thereof. It will be understood by those skilled in the art that various changes in form and details may be made therein without departing from the essential characteristics of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

The embodiments of the present invention can be written as computer programs and can be implemented in general-use digital computers that execute the programs using a computer-readable recording medium. Examples of the computer-readable recording medium may include storage media such as magnetic storage media (e.g., ROMs, floppy disks, hard disks, etc.), optical recording media (e.g., CD-ROMs, DVDs, etc.), etc.

What is claimed is:

1. A speech translation method using a multilingual text-to-speech synthesis model, comprising:
   receiving input speech data of first language and an articulatory feature of a speaker regarding the first language;

converting the input speech data of the first language into a text of the first language;

converting the text of the first language into a text of second language; and generating output speech data for the text of the second language that simulates speech of the speaker by inputting the text of the second language and the articulatory feature of the speaker to a single artificial neural network text-to-speech synthesis model, wherein the single artificial neural network text-to-speech synthesis model is trained by inputting a plurality of learning texts of the first language, learning speech data of the first language corresponding to the plurality of learning texts of the first language, a speaker vector associated with the learning speech data of the first language, a plurality of learning texts of the second language, learning speech data of the second language corresponding to the plurality of learning texts of the second language, and a speaker vector associated with the learning speech data of the second language to the single artificial neural network text-to-speech synthesis model, the second language being different from the first language, and wherein the articulatory feature of the speaker regarding the first language is generated by extracting a feature vector from the input speech data uttered by the speaker in the first language, and wherein each of the plurality of learning texts of the first language and the plurality of learning texts of the second language includes a plurality of text embedding vectors corresponding to text divided by units of a syllable, a character, or a phoneme.

2. The speech translation method according to claim 1, further comprising generating an emotion feature of the speaker regarding the first language from the input speech data of the first language, wherein the generating the output speech data for the text of the second language that simulates the speech of the speaker includes generating the output speech data for the text of the second language that simulates the speech of the speaker by inputting the text of the second language, the articulatory feature, and the emotion feature of the speaker regarding the first language to the single artificial neural network text-to-speech synthesis model.

3. The speech translation method according to claim 2, wherein the emotion feature includes information on emotions inherent in a content uttered by the speaker.

4. The speech translation method according to claim 1, further comprising generating a prosody feature of the speaker regarding the first language from the input speech data of the first language, wherein the generating the output speech data for the text of the second language that simulates the speech of the speaker includes generating the output speech data for the text of the second language that simulates the speech of the speaker by inputting the text of the second language, the articulatory feature, and the prosody feature of the speaker regarding the first language to the single artificial neural network text-to-speech synthesis model.

5. The speech translation method according to claim 4, wherein the prosody feature includes at least one of information on utterance speed, information on accentuation, information on voice pitch, and information on pause duration.

6. The speech translation method according to claim 1, wherein the articulatory feature of the speaker regarding the first language includes a speaker ID or a speaker embedding vector.

7. A non-transitory computer readable storage medium having recorded thereon a program comprising instructions for performing the steps of the method according to claim 1.

8. A video translation method using a multilingual text-to-speech synthesis model, comprising:

receiving video data including input speech data of first language, a text of the first language corresponding to the input speech data of the first language, and an articulatory feature of a speaker regarding the first language;

deleting the input speech data of the first language from the video data;

converting the text of the first language into a text of second language;

generating output speech data for the text of the second language that simulates speech of the speaker by inputting the text of the second language and the articulatory feature of the speaker regarding the first language to a single artificial neural network text-to-speech synthesis model; and combining the output speech data with the video data, wherein the single artificial neural network text-to-speech synthesis model is trained by inputting a plurality of learning texts of the first language, learning speech data of the first language corresponding to the plurality of learning texts of the first language, a speaker vector associated with the learning speech data of the first language, a learning text of the second language and learning speech data of the second language corresponding to the learning text of the second language, and a speaker vector associated with the learning speech data of the second language to the single artificial neural network text-to-speech synthesis model, the second language being different from the first language, and wherein the articulatory feature of the speaker regarding the first language is generated by extracting a feature vector from the input speech data uttered by the speaker in the first language, and wherein each of the plurality of learning texts of the first language and the plurality of learning texts of the second language includes a plurality of text embedding vectors corresponding to text divided by units of a syllable, a character, or a phoneme.

9. The video translation method according to claim 8, further comprising generating an emotion feature of the speaker regarding the first language from the input speech data of the first language, wherein the generating the output speech data for the text of the second language that simulates the speech of the speaker includes generating the output speech data for the text of the second language that simulates the speech of the speaker by inputting the text of the second language, the articulatory feature, and the emotion feature of the speaker regarding the first language to the single artificial neural network text-to-speech synthesis model.

10. The video translation method according to claim 8, further comprising generating a prosody feature of the speaker regarding the first language from the input speech data of the first language, wherein the generating the output speech data for the text of the second language that simulates the speech of the speaker includes generating the output speech data for the text of the second language that simulates the speech of the speaker by inputting the text of the second language, the articulatory feature, and the prosody feature of the speaker regarding the first language to the single artificial neural network text-to-speech synthesis model.

11. A speech translation system using a multilingual text-to-speech synthesis model, comprising:

a memory; and at least one processor connected to the memory and configured to execute at least one computer-readable program included in the memory, wherein the at least one computer-readable program includes instructions for:

receiving input speech data of first language and an articulatory feature of a speaker regarding the first language;

converting the input speech data of the first language into a text of the first language;

converting the text of the first language into a text of second language; and generating output speech data for the text of the second language that simulates speech of the speaker by inputting the text of the second language and the articulatory feature of the speaker to a single artificial neural network text-to-speech synthesis model, wherein the single artificial neural network text-to-speech synthesis model is trained by inputting a learning text of the first language, learning speech data of the first language corresponding to the learning text of the first language, a speaker vector associated with the learning speech data of the first language, a learning text of the second language, learning speech data of the second language corresponding to the learning text of the second language, and a speaker vector associated with the learning speech data of the second language to the single artificial neural network text-to-speech synthesis model, the second language being different from the first language, and wherein the articulatory feature of the speaker regarding the first language is generated by extracting a feature vector from the input speech data uttered by the speaker in the first language, and wherein each of the plurality of learning texts of the first language and the plurality of learning texts of the second language includes a plurality of text embedding vectors corresponding to text divided by units of a syllable, a character, or a phoneme.

* * * * *